United States Patent
Miyato et al.

(10) Patent No.: US 7,659,837 B2
(45) Date of Patent: Feb. 9, 2010

(54) OPERATION PROCESSING APPARATUS, OPERATION PROCESSING CONTROL METHOD, AND COMPUTER PROGRAM

(75) Inventors: Yoshikazu Miyato, Saitama (JP); Toru Akishita, Tokyo (JP)

(73) Assignee: Sony Corporation, Tokyo (JP)

(*) Notice: Subject to any disclaimer, the term of this patent is extended or adjusted under 35 U.S.C. 154(b) by 37 days.

(21) Appl. No.: 11/948,582

(22) Filed: Nov. 30, 2007

(65) Prior Publication Data
US 2008/0143561 A1 Jun. 19, 2008

(30) Foreign Application Priority Data
Dec. 15, 2006 (JP) ............... P2006-337828

(51) Int. Cl.
*H03M 7/00* (2006.01)
(52) U.S. Cl. .......................... 341/50; 341/51
(58) Field of Classification Search ............ 341/50, 341/51, 145, 144, 155, 156
See application file for complete search history.

(56) References Cited

U.S. PATENT DOCUMENTS

| | | | | |
|---|---|---|---|---|
| 4,100,606 A | * | 7/1978 | Brantingham | 708/142 |
| 5,717,715 A | * | 2/1998 | Claydon et al. | 375/220 |
| 5,963,154 A | * | 10/1999 | Wise et al. | 341/67 |
| 6,130,633 A | * | 10/2000 | Lee et al. | 341/143 |
| 6,741,198 B2 | * | 5/2004 | McIlrath | 341/155 |

FOREIGN PATENT DOCUMENTS

| | | |
|---|---|---|
| JP | 2000-036736 | 2/2000 |
| JP | 2003-223100 | 8/2003 |

OTHER PUBLICATIONS

P. Kocher, et al., "Differential Power Analysis", CRYPTO 1999, Lecture Note in Computer Science, vol. 1666, Springer-Verlag, pp. 388-397 (1999).
E. Oswald, et al., "A Side-Channel Analysis Resistant Description of the AES S-box", FSE 2005, LNCS 3557, pp. 413-423.
K. Tiri et al., "Securing Encryption Algorithms against DPA at the Logic Level: Next Generation Smart Card Technology", CHES 2003, LNCS 2779, pp. 125-136.
Japanese Office Action mailed Dec. 24, 2008 in counterpart Japanese Application No. 2006-337828.

* cited by examiner

*Primary Examiner*—Jean B Jeanglaude
(74) *Attorney, Agent, or Firm*—Finnegan, Henderson, Farabow, Garrett & Dunner, L.L.P.

(57) ABSTRACT

An operation processing apparatus adapted to perform a data conversion on input bits has a logic circuit adapted to perform a data conversion on input bits. The logic circuit includes selectors configured in a hierarchical layer structure and controlled by select signals corresponding to the input bits. Constant values input to selectors located in a bottom layer of the hierarchical structure are selected and transferred toward a top layer from one layer to another. A constant value is finally selected and output from the top layer. The data conversion process is controlled by a control unit such that a pre-charge phase and an evaluation phase are performed alternately. In the pre-charge phase, all input values to the selectors are set to be equal. In the evaluation phase, an output bit for given input bits is produced. The select signals are switched in the pre-charge phase.

19 Claims, 18 Drawing Sheets

FIG. 4
LOW-ORDER 4 BITS

|   | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 63 | 7C | 77 | 7B | F2 | 6B | 6F | C5 | 30 | 01 | 67 | 2B | FE | D7 | AB | 76 |
| 1 | CA | 82 | C9 | 7D | FA | 59 | 47 | F0 | AD | D4 | A2 | AF | 9C | A4 | 72 | E0 |
| 2 | B7 | FD | 93 | 26 | 36 | 3F | F7 | CC | 34 | A5 | E5 | F1 | 71 | D8 | 31 | 15 |
| 3 | 04 | C7 | 23 | C3 | 18 | 96 | 05 | 9A | 07 | 12 | 80 | E2 | EB | 27 | B2 | 75 |
| 4 | 09 | 83 | 2C | 1A | 1B | 6E | 5A | A0 | 52 | 3B | D6 | B3 | 29 | E3 | 2F | 84 |
| 5 | 53 | D1 | 00 | ED | 20 | FC | B1 | 5B | 6A | CD | BE | 39 | 4A | 4C | 58 | CF |
| 6 | D0 | EF | AA | FB | 43 | 4D | 33 | 85 | 45 | F9 | 02 | 7F | 50 | 3C | 9F | A8 |
| 7 | 51 | A3 | 40 | 8F | 92 | 9D | 38 | F5 | BC | B6 | DA | 21 | 10 | FF | F3 | D2 |
| 8 | CD | 0C | 13 | EC | 5F | 97 | 44 | 17 | C4 | A7 | 7E | 3D | 64 | 5D | 19 | 73 |
| 9 | 60 | 81 | 4F | DC | 22 | 2A | 90 | 88 | 46 | EE | B8 | 14 | DE | 5E | 0B | DB |
| a | E0 | 32 | 3A | 0A | 49 | 06 | 24 | 5C | C2 | D3 | AC | 62 | 91 | 95 | E4 | 79 |
| b | E7 | C8 | 37 | 6D | 8D | D5 | 4E | A9 | 6C | 56 | F4 | EA | 65 | 7A | AE | 08 |
| c | BA | 78 | 25 | 2E | 1C | A6 | B4 | C6 | E8 | DD | 74 | 1F | 4B | BD | 8B | 8A |
| d | 70 | 3E | B5 | 66 | 48 | 03 | F6 | 0E | 61 | 35 | 57 | B9 | 86 | C1 | 1D | 9E |
| e | E1 | F8 | 98 | 11 | 69 | D9 | 8E | 94 | 9B | 1E | 87 | E9 | CE | 55 | 28 | DF |
| f | 8C | A1 | 89 | 0D | BF | E6 | 42 | 68 | 41 | 99 | 2D | 0F | B0 | 54 | BB | 16 |

HIGH-ORDER 4 BITS

FIG. 6

LOW-ORDER 4 BITS

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 1 | 0 | 1 | 1 | 0 | 1 | 1 | 1 | 0 | 1 | 1 | 1 | 0 | 1 | 1 | 0 |
| 1 | 0 | 0 | 1 | 1 | 0 | 1 | 1 | 0 | 1 | 0 | 0 | 1 | 0 | 0 | 0 | 0 |
| 2 | 1 | 1 | 1 | 0 | 0 | 1 | 1 | 0 | 0 | 1 | 1 | 1 | 1 | 0 | 1 | 1 |
| 3 | 0 | 1 | 1 | 1 | 0 | 0 | 1 | 0 | 1 | 0 | 0 | 0 | 1 | 1 | 0 | 1 |
| 4 | 1 | 1 | 0 | 0 | 1 | 0 | 0 | 0 | 0 | 1 | 0 | 1 | 1 | 1 | 1 | 0 |
| 5 | 1 | 1 | 0 | 1 | 0 | 0 | 1 | 1 | 0 | 1 | 0 | 1 | 0 | 0 | 0 | 1 |
| 6 | 0 | 1 | 0 | 1 | 1 | 1 | 1 | 1 | 1 | 1 | 0 | 1 | 0 | 0 | 1 | 0 |
| 7 | 1 | 1 | 0 | 1 | 0 | 1 | 0 | 1 | 0 | 0 | 0 | 1 | 0 | 1 | 1 | 0 |
| 8 | 1 | 0 | 1 | 0 | 1 | 1 | 0 | 1 | 0 | 1 | 0 | 1 | 0 | 1 | 1 | 1 |
| 9 | 0 | 1 | 1 | 0 | 0 | 0 | 0 | 0 | 0 | 0 | 0 | 0 | 1 | 0 | 1 | 1 |
| a | 0 | 0 | 0 | 0 | 1 | 0 | 0 | 0 | 0 | 1 | 0 | 0 | 1 | 1 | 0 | 1 |
| b | 1 | 0 | 1 | 1 | 1 | 1 | 0 | 1 | 0 | 0 | 0 | 0 | 1 | 0 | 0 | 0 |
| c | 0 | 0 | 1 | 0 | 0 | 0 | 0 | 0 | 0 | 1 | 0 | 1 | 1 | 1 | 1 | 0 |
| d | 0 | 0 | 1 | 0 | 0 | 1 | 0 | 0 | 1 | 1 | 1 | 1 | 0 | 1 | 1 | 0 |
| e | 1 | 0 | 0 | 1 | 1 | 1 | 0 | 0 | 1 | 0 | 1 | 1 | 0 | 1 | 0 | 1 |
| f | 0 | 1 | 1 | 1 | 1 | 0 | 0 | 0 | 1 | 1 | 1 | 1 | 0 | 0 | 1 | 0 |

HIGH-ORDER 4 BITS

| SELECTOR INPUT SIGNAL | Pre-Chage | Eval | Pre-Chage | Eval | Pre-Chage | ... |
|---|---|---|---|---|---|---|
| CONSTANT VALUE INPUT (a) | 0 | a | 0 | a | 0 | ... |
| CONSTANT VALUE INPUT (b) | 0 | b | 0 | b | 0 | ... |
| SELECT SIGNAL INPUT (sel) | 0 | sel | 0 | sel | 0 | ... |
| INVERTED SELECT SIGNAL INPUT ($\overline{sel}$) | 0 | $\overline{sel}$ | 0 | $\overline{sel}$ | 0 | ... |

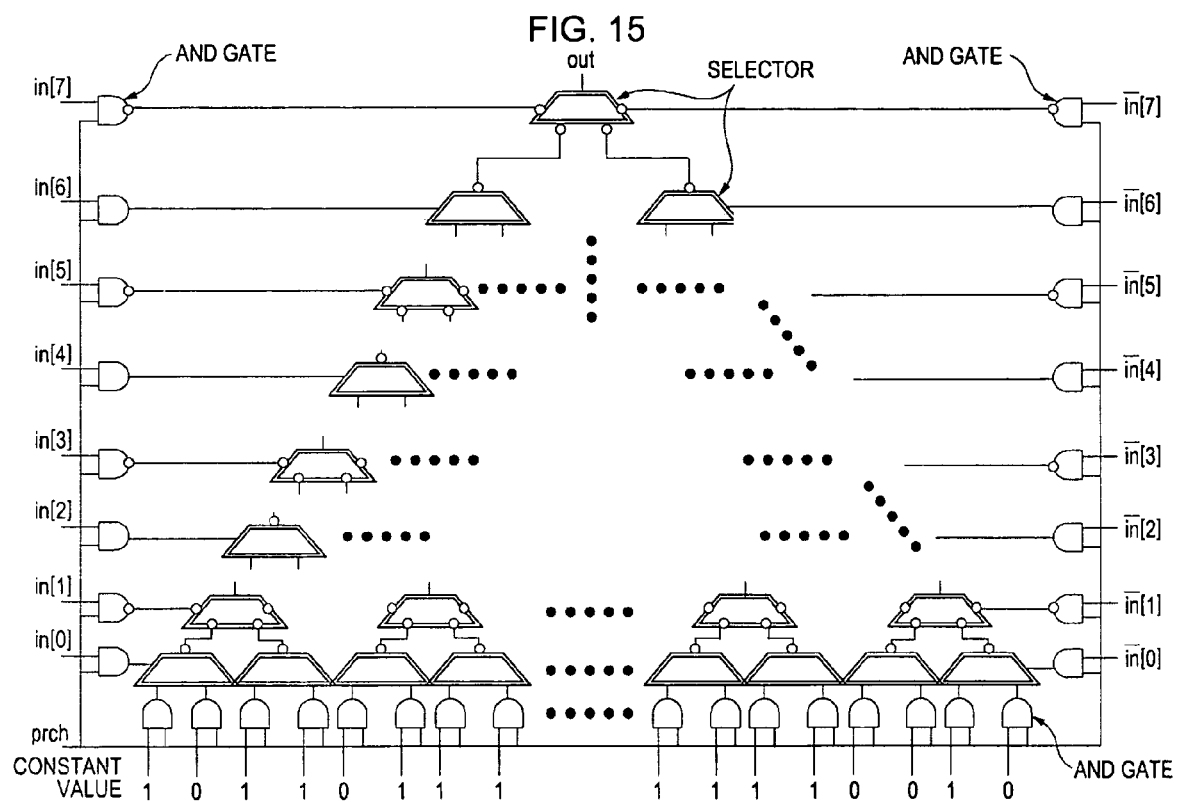

OPERATION PROCESSING APPARATUS, OPERATION PROCESSING CONTROL METHOD, AND COMPUTER PROGRAM

CROSS REFERENCES TO RELATED APPLICATIONS

The present invention contains subject matter related to Japanese Patent Application JP 2006-337828 filed in the Japanese Patent Office on Dec. 15, 2006, the entire contents of which are incorporated herein by reference.

BACKGROUND OF THE INVENTION

1. Field of the Invention

The present invention relates to an operation processing apparatus, an operation process control method, and a computer program. More specifically, the present invention relates to an operation processing apparatus using a logic circuit, an operation process control method, and a computer program, capable of efficiently performing an operation associated with common key cryptography such as that according to the AES (Advanced Encryption Standard) standard, or public key cryptography such as that according to the RSA (Rivest-Sharmir-Adleman) algorithm, or efficiently performing an operation associated with a hash function such as that according to SHA-1 (Secure Hash Algorithm 1).

2. Description of the Related Art

In recent years, network communication and electronic commerce have become very popular. As a result, security in communication is becoming increasingly important. One technique to achieve high security in communication is to use cryptography, and many cryptography techniques are actually used in communication.

Cryptography methods are categorized into two types: common key cryptography, and public key cryptography. Specific examples of common key cryptography techniques are that using a DES (Data Encryption Standard) algorithm and that using AES (Advanced Encryption Standard) algorithm. The AES cryptography is widely used as a successor to the DES cryptography. Specific examples of public key cryptography are RSA (Rivest-Shamir-Adleman) cryptography and ECC (Elliptic Curve Cryptography) cryptography.

A cryptographic processing device for performing a cryptographic process according to such an algorithm may be implemented on a CPU by executing a program written in a program language such as C, or may be implemented in the form of a hardware device using various gate circuits.

The cryptographic processing device performs a data encryption process to encrypt given plaintext into ciphertext or a data decryption process to decrypt given ciphertext into plaintext. It is desirable that the encryption or decryption process be performed in a secure manner so that information does not leak out. However, in reality, various techniques to analyze or attack keys or algorithms used in encryption or decryption are known. The attack methods can be categorized into two types, destructive attacks and nondestructive attacks.

In the destructive attack, a package of an IC chip is dissolved by a chemical process using a chemical agent such as nitric acid, and secret information is physically read from an exposed die of the IC chip. It is known to reproduce a circuit from an interconnection pattern on an exposed die. This is known as reverse engineering. It is possible to extract secret information directly from the interconnection pattern. It is also known to detect states of memory cells by irradiating the memory cells with a laser beam or an electromagnetic wave to observe secret information written in the memory.

The nondestructive attack is also called a side-channel attack. In this method, the package of the IC chip is not chemically resolved, but secret information is detected from physical information obtainable from the outside, such as a consumption current, electromagnetic radiation, operation time, etc. For example, in a paper written by Kocher et. al in 1999 (Paul C. Kocher, Joshaua Jaffe and Benjamin Jun, "Differential Power Analysis", CRYPTO 1999, Lecture Note in Computer Science, Vol. 1666, Springer-Verlag (1999), pp. 388-397 (hereinafter, referred to as Non-Patent Document 1)), discussed is a technique to detect key information, which is secret information, by observing a change in consumption current which occurs when a cryptographic process according to a DES algorithm, which is one of common key cryptography techniques, is performed by a device. The presence of attack techniques results in a possibility that secret information leaks out unless secret, and thus there is a need for a technique to protect information more securely.

More specifically, in the DPA (Differential Power Analysis) attack discussed in Non-Patent Document 1, current consumption is observed for many cryptographic operations corresponding to different input plaintext, and the current consumption is statistically analyzed based on bit values of secret information. A current consumption pattern having a correlation with secret information is detected via the statistical analysis, and secret information is extracted from the current consumption pattern.

Various techniques to prevent secret information from the attacks described above have been proposed. For example, a technique to prevent information associated with AES algorithm, which is one of common key cryptography methods, is discussed in a paper by Elisabeth Oswald et al. (Elisabeth Oswald, Stefan Mangard, Norbert Pramstaller, "A Side-Channel Analysis Resistant Description of the AES S-box", FSE 2005, LNCS 3557, pp. 413-423 (hereinafter, referred to as Non-Patent Document 2)). In this technique, an S-box operation called a subbyte transformation in the AES operation is protected by hiding intermediate values including secret information by using random numbers.

In a paper by Kris Tiri et al. (Kris Tiri, Ingrid Verbauwhede, "Securing Encryption Algorithms against DPA at the Logic Level: Next Generation Smart Card Technology", CHES 2003, LNCS 2779, pp. 125-136 (hereinafter, referred to as Non-Patent Document 3)), a technique using WDDL (Wave Differential Dynamic Logic) is disclosed to protect secret information by performing an operation alternately in a pre-charge phase and an operation in an evaluation phase.

In the pre-charge phase, gate circuits are initialized, and an actual operation is performed in the evaluation phase. Inputs to the gate circuits are given in a complementary form, and outputs from the gate circuits appear in a complementary form. Positive logic and negative logic are formed for the complementary inputs thereby obtaining complementary outputs. In the WDDL technique in which the pre-charge phase and the evaluation phase are alternately performed and inputs and outputs appear in the complementary form, any signal is allowed to change only at a transition from the pre-charge phase to the evaluation phase or from the evaluation phase to the pre-charge phase.

Because of the above-described characteristic of the WDDL, unnecessary transient changes do not occur. Besides, in the WDDL, in response to any input, only one of two outputs changes. Thus no change occurs in current consumption of the CMOS (Complementary Metal Oxide Semiconductor) logic, because charging/discharging occurs only when a change occurs in the logic state. Therefore, a change in current consumption depending on the bit values of secret information does not occur. This is effective to protect secret information from the DPA attack.

The internal S-box operation called the subbyte transformation operation in the AES algorithm can be executed by hardware using, for example, a binary decision diagram (BDD). The binary decision diagram (BDD) will be described in detail later. The description of the binary decision diagram (BDD) may also be found, for example, in Japanese Unexamined Patent Application Publication No. 2003-223100 (hereinafter, referred to as Patent Document 1).

Patent Document 1 includes a discussion of a configuration of an S-box or a binary decision diagram (BDD) by a combinational circuit and a practical implementation thereof. The cryptographic operation using the common key cryptography includes a nonlinear conversion process using a nonlinear conversion unit called an S-box. The total operation speed of the cryptographic operation greatly depends on the operation speed of the S-box. For example, the S-box for the AES algorithm needs a circuit for determining inverse elements in a Galois field.

If this circuit is implemented using a composite field or the like instead of using a binary decision diagram (BDD), a circuit delay is a few times greater than that in the circuit based on the binary decision diagram (BDD). Thus, from the point of view of the operation speed, it is desirable to implement the circuit using the binary decision diagram (BDD).

SUMMARY OF THE INVENTION

However, in the technique to protect secret information described in Non-Patent Document 1, a transient change occurs in signal level due to a difference in propagation delay among internal signals, and there is a possibility that intermediate values including secret information are detected from this transient change. Thus secret information is not perfectly hidden.

In the technique using the WDDL disclosed in Non-Patent Document 2, it is necessary to determine a circuit pattern layout such that there is no difference in propagation delay between complementary signals. In operation, if there is a significant difference in propagation delay between two inputs, the difference can cause secret information to be detected by the DPA attack.

When the nonlinear conversion circuit is implemented using the binary decision diagram (BDD) to achieve a high operation speed, a possibility occurs that secret information such as a secret key is detected, by a DPA attack, from unnecessary transient changes in signals. That is, in the operation by the logic circuit based on the binary decision diagram (BDD), transient changes in internal signals occur. Therefore, secret information can be detected from the transient changes by the DPA attack.

In view of the above, it is desirable to provide an operation processing apparatus, an operation process control method, and a computer program, capable of performing an operation using a logic circuit with minimized delay differences without having unnecessary transient changes in signals, and with high resistance to an attack such as the DPA attack trying to reveal secret information.

According to an embodiment of the present invention, there is provided an operation processing apparatus adapted to perform a data conversion on input bits, including a logic circuit including a plurality of selectors which are controlled by select signals input thereto, the select signal being given by the input bits, the selectors being configured in a hierarchical layer structure such that constant values are input to a plurality of selectors located in a bottom layer, the constant values are selected and transferred to selectors in a higher layer according to the select signals from layer to layer, and a constant value is finally selected by a selector in a highest layer and output from the selector in the highest layer, and a control unit adapted to control the data conversion process using the logic circuit. The control unit controls the data conversion process such that a pre-charge phase and an evaluation phase are performed alternately, in the pre-charge phase all input values to the selectors in the logic circuit being set to be equal, in the evaluation phase an output bit corresponding to the input bits being produced, the select signals given by the input bits being switched in the pre-charge phase.

In this operation processing apparatus, each selector in the logic circuit may include a first AND gate to which one of the constant values and the select signal are input, a second AND gate to which one of the constant values and an inverted select signal of the select signal are input, and an OR gate to which the output of the first AND gate and the output of the second AND gate are input, and the control unit may set the inputs to the first AND gate and the second AND gate to an equal value in the pre-charge phase.

In the operation processing apparatus, each selector in the logic circuit may include an input node via which to receive the select signal and an input node via which to receive the inverted select signal of the select signal, the logic circuit may further include logic operation elements disposed at stages before the respective select signal input nodes, and logic operation elements disposed at stages before the inverted select signal input nodes, and logic operation elements disposed at stages before respective selectors which are located in the bottom layer and to which the constant values are input, each logic operation element being adapted to receive a pre-charge signal, and the control unit may switch the pre-charge signal input to the logic operation elements to switch the phase between the pre-charge phase and the evaluation phase.

In this operation processing apparatus, each logic operation element may be an AND gate, to one of inputs of which the pre-charge signal is input, and the control unit may switch the pre-charge signal input to the one of inputs of each AND gate to switch the phase between the pre-charge phase and the evaluation phase.

In the operation processing apparatus, each logic operation element may be an OR gate, to one of inputs of which the pre-charge signal is input, and the control unit may switch the pre-charge signal input to the one of inputs of each OR gate to switch the phase between the pre-charge phase and the evaluation phase.

In the operation processing apparatus, of the selectors in the logic circuit, a plurality of selectors to which an equal input value is supplied may be replaced with a single common selector.

In the operation processing apparatus, the selectors in the logic circuit may include selectors having an inverting output and selectors having an inverting input.

In the operation processing apparatus, the control unit may control the data conversion process such that in the pre-charge phase, a constant value is input to each selector disposed in the bottom layer, while in the evaluation phase, the constant values or random values are input to the selectors in the bottom layer.

In the operation processing apparatus, the control unit may control the outputs of the gate circuits such that the inputs to the selectors in the bottom layer are randomly set to "0" or "1" in the pre-charge phase.

In the operation processing apparatus, the logic circuit may be configured so as to implement a binary decision diagram (BDD).

In the operation processing apparatus, the logic circuit may be adapted to perform a nonlinear conversion process as the data conversion process on the input bits.

According to an embodiment of the present invention, there is provided an operation process control method for controlling a data conversion process on input bits in an operation processing apparatus, the operation processing apparatus including a logic circuit including a plurality of selectors which are controlled by select signals input thereto, the select signal being given by the input bits, the selectors being configured in a hierarchical layer structure such that constant values are input to a plurality of selectors located in a bottom layer, the constant values are selected and transferred to selectors in a higher layer according to the select signals from layer to layer, and a constant value is finally selected by a selector in a highest layer and output from the selector in the highest layer, and the method including controlling, by a control unit, the data conversion process using the logic circuit such that a pre-charge phase and an evaluation phase are performed alternately, in the pre-charge phase all input values to the selectors in the logic circuit being set to be equal, in the evaluation phase an output bit corresponding to the input bits being produced, the select signals given by the input bits being switched in the pre-charge phase.

In this operation process control method, each selector in the logic circuit may include a first AND gate to which one of the constant values and the select signal are input, a second AND gate to which one of the constant values and an inverted select signal of the select signal are input, and an OR gate to which the output of the first AND gate and the output of the second AND gate are input, and the control unit may set the inputs to the first AND gate and the second AND gate to an equal value in the pre-charge phase.

In the operation process control method, each selector in the logic circuit may include an input node via which to receive the select signal and an input node via which to receive the inverted select signal of the select signal, and the logic circuit may further include logic operation elements disposed at stages before the respective select signal input nodes, and logic operation elements disposed at stages before the inverted select signal input nodes, and logic operation elements disposed at stages before respective selectors which are located in the bottom layer and to which the constant values are input, each logic operation element being adapted to receive a pre-charge signal, and the control unit may switch the pre-charge signal input to the logic operation elements to switch the phase between the pre-charge phase and the evaluation phase.

In the operation process control method, each logic operation element may be an AND gate, to one of inputs of which the pre-charge signal is input, and the control unit may switch the pre-charge signal input to the one of inputs of each AND gate to switch the phase between the pre-charge phase and the evaluation phase.

In the operation process control method, each logic operation element may be an OR gate, to one of inputs of which the pre-charge signal is input, and the control unit may switch the pre-charge signal input to the one of inputs of each OR gate to switch the phase between the pre-charge phase and the evaluation phase.

In the operation process control method, the control unit may control the data conversion process such that in the pre-charge phase, a constant value is input to each selector disposed in the bottom layer, while in the evaluation phase, the constant values or random values are input to the selectors in the bottom layer.

In the operation process control method, the control unit may control the data conversion process such that the inputs to the selectors in the bottom layer are randomly set to "0" or "1" in the pre-charge phase.

According to an embodiment of the present invention, there is provided a computer program executable by an operation processing apparatus to perform a data conversion process on input bits, the operation processing apparatus including a logic circuit including a plurality of selectors which are controlled by select signals input thereto, the select signal being given by the input bits, the selectors being configured in a hierarchical layer structure such that constant values are input to a plurality of selectors located in a bottom layer, the constant values are selected and transferred to selectors in a higher layer according to the select signals from layer to layer, and a constant value is finally selected by a selector in a highest layer and output from the selector in the highest layer, and the computer program controlling the data conversion process such that a pre-charge phase and an evaluation phase are performed alternately, in the pre-charge phase all input values to the selectors in the logic circuit being set to be equal, in the evaluation phase an output bit corresponding to the input bits being produced, the select signals given by the input bits being switched, in the pre-charge phase.

The computer program may be provided to a computer system capable of executing various computer program codes via a storage medium such as a CD, a FD, or an MO on which the program is stored in a computer-readable manner or via a communication medium such as a network. By providing the program in the computer-readable form as described above, it becomes possible to execute processes on the computer system in accordance with the program.

Further objects, features, and advantages of the present invention will become apparent from the following description of exemplary embodiments with reference to the accompanying drawings. In the present description, the term "system" is used to describe a logical collection of a plurality of devices, and it is not necessarily required that the plurality of devices be disposed in a single case.

In the embodiments according to the present invention, as described above, the logic operation apparatus for the data conversion such as the nonlinear data conversion is configured such that, in the pre-charge phase, all inputs of the selectors in the logic circuit are maintained at an equal value and input bits are switched, while in the evaluation phase following the pre-charge phase, the data conversion process is performed and the output bit is produced. Because all selector inputs are reset to the same value in the pre-charge phase, it becomes difficult to perform analysis based on the transient change in signal at times at which input bits are switched, and thus the logic operation apparatus has high resistance to the DPA (Differential Power Analysis) or the like.

BRIEF DESCRIPTION OF THE DRAWINGS

FIG. 4 illustrates an example of a conversion table (S-box table) used in a nonlinear conversion process;

FIG. 6 illustrates a conversion table indicating only the least significant bit of each of 256 output values indicated in the table shown in FIG. 4;

FIG. 15 illustrates a logic circuit configured using inverting output selectors and inverting input selectors according to an embodiment of the present invention;

DESCRIPTION OF THE PREFERRED EMBODIMENTS

The operation processing apparatus, the operation process control method, and the computer program according to the present invention are described in further detail below with reference to specific embodiments.

In the embodiments described below, it is assumed by way of example that the invention is applied to a cryptographic process using an AES (Advanced Encryption Standard) algorithm which is one of common key cryptography methods. In the AES algorithm, for example, 128-bit plaintext is converted into 128-bit ciphertext. As with the DES (Data Encryption Standard) algorithm which is a conventional common key cryptography method, data conversion is achieved by repeatedly performing a round operation. Note that the present invention is applicable not only to the common key cryptography process using the AES or DES algorithm but also to a wide variety of nonlinear or linear data conversion processes such as a public key cryptography process based on the RSA algorithm or the like, a calculation of a hash function such as SHA-1, etc.

The description of specific embodiments of the present invention includes following sections.

1. Basic functional configuration of cryptographic process using common key

2. General configuration of nonlinear conversion unit (S-box) using BDD

3. First example of nonlinear conversion unit according to the invention

Figure 1:
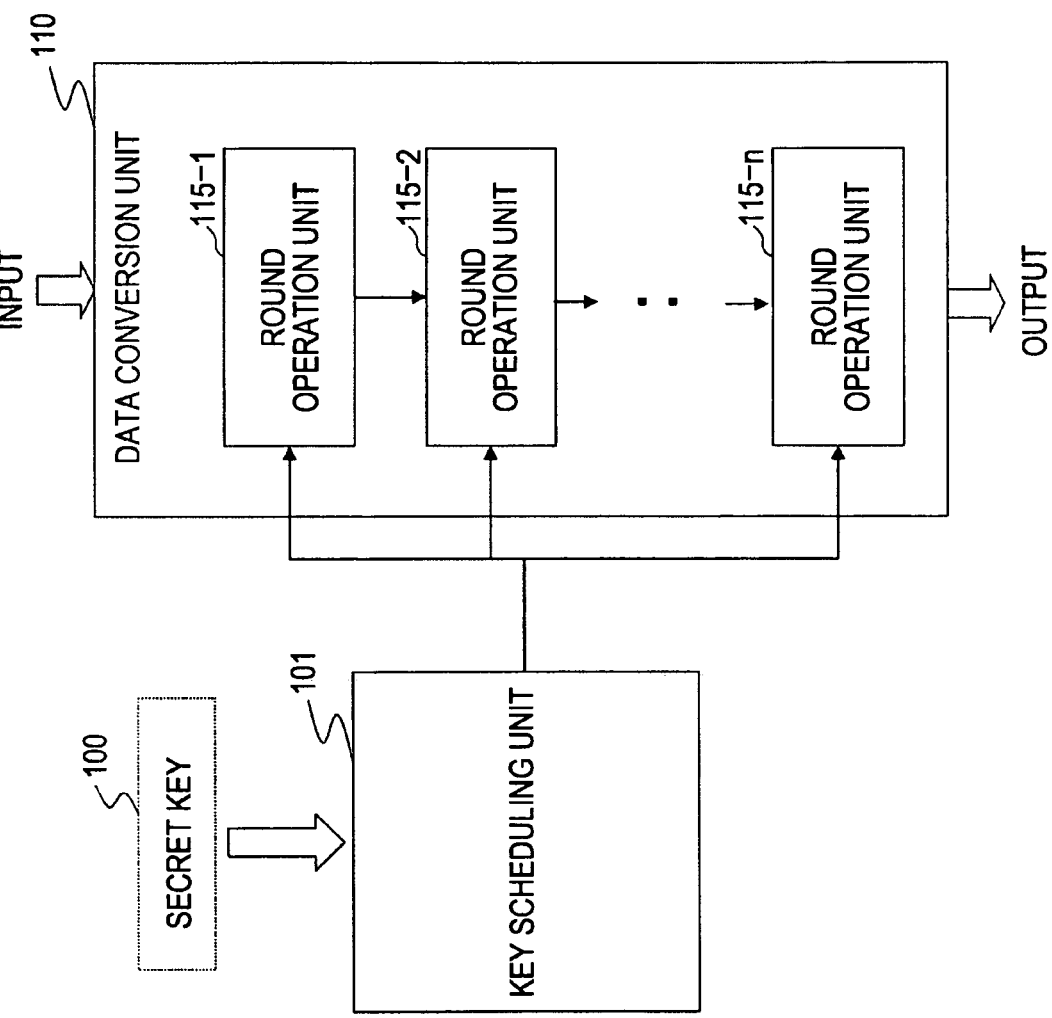
FIG. 1 illustrates an example of a basic functional configuration for an encryption process according to common key cryptography using an AES algorithm or a DES algorithm.

4. Second example of nonlinear conversion unit (having selectors used in common) according to the invention 5. Third example of nonlinear conversion unit (configured using inverting output selectors and inverting input selectors) according to the invention 6. Fourth example of nonlinear conversion unit (using random numbers as inputs) according to the invention 7. Fifth example of nonlinear conversion unit (including OR gates) according to the invention 8. Example of cryptography processing apparatus 1. Basic Functional Configuration of Cryptographic Process Using Common Key FIG. 1 illustrates an example of a basic functional configuration for an encryption process according to common key cryptography using an AES algorithm or a DES algorithm. As shown in FIG. 1, the basic functional configuration of the common key cryptography includes a key scheduling unit 101 and a data converter 110. The key scheduling unit 101 receives a secret key 100, and produces round keys to be used in respective rounds, on the basis of the received secret key 100. The produced round keys are supplied to respective round operation units 151-1 to 151-$n$.

In the data converter 110, the round operation units 151-1 to 151-$n$ perform the data conversion on the received data in accordance with the round keys supplied from the key scheduling unit 101, and resultant converted data is output.

In the data conversion process by the round operation units 151-1 to 151-$n$, similar round operations are performed repeatedly. In each round, a nonlinear conversion using a conversion table, a linear conversion, or a data conversion using an input key (round key) is performed on input bits. The result of the operation in each round is transferred to a next round.

For example, in the AES encryption process, the nonlinear conversion process performed by the round operation units 151-1 to 151-$n$ is called a subbyte transformation. The nonlinear conversion process called the subbyte transformation is performed using a nonlinear conversion table (S-box table) prepared in advance.

Figure 2:
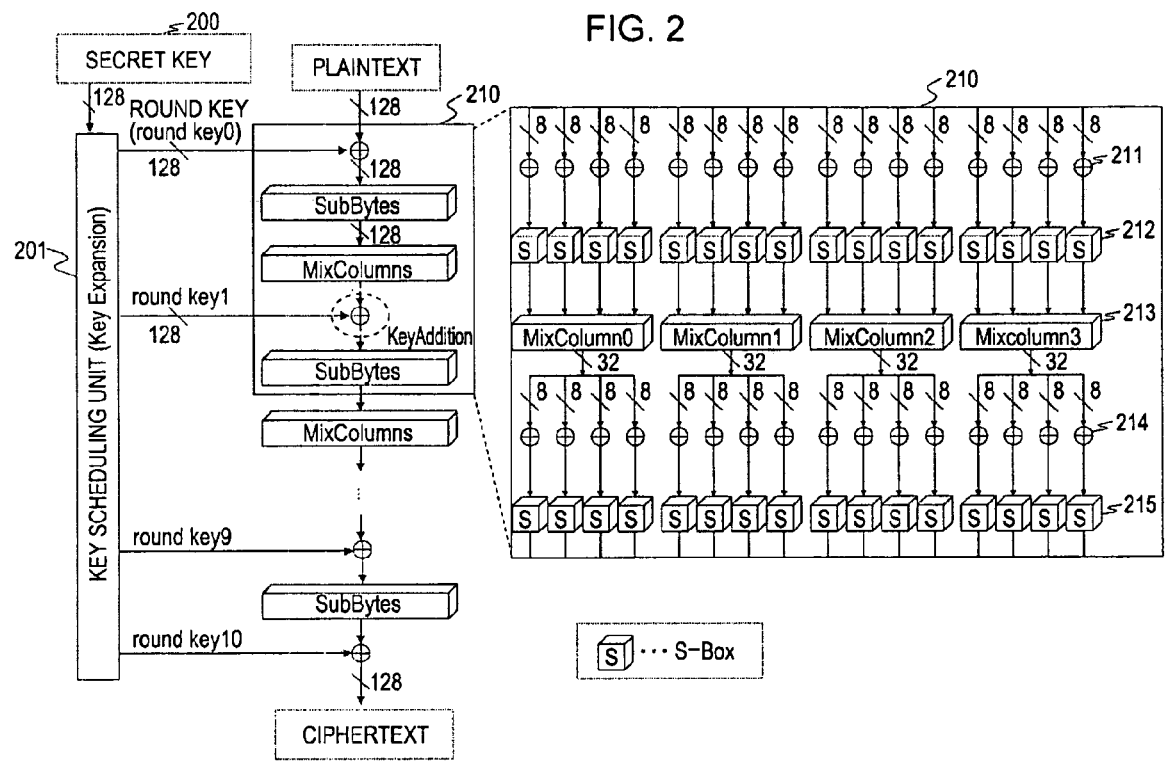
FIG. 2 illustrates an example of a functional configuration for an encryption process according to an AES algorithm.

FIG. 2 illustrates details of the AES cryptographic process. A key scheduling unit 201 receives a secret key 200 and produces round keys to be used in respective rounds, on the basis of the received secret key 200. The produced round keys are supplied to respective round operation units 210. As shown in FIG. 2, the round operation unit 210 for the AES encryption includes exclusive OR gates 211 serving to calculate the exclusive OR between input data and a round key, S-boxes 212 serving to perform a nonlinear transformation called a subbyte transformation, mix-column units 213 serving to exchange data output from the respective S-boxes 212, exclusive OR gates 214 serving to calculate the exclusive OR between data output from the respective mix-column units 213 and a round key, and S-boxes 215 serving to perform a nonlinear transformation on data output from the respective exclusive OR gates 214. Note that in the process described above, data is divided into a plurality of segments each including 8 bits, and the process is performed in units of 8-bit data as shown in FIG. 2.

Figure 3:
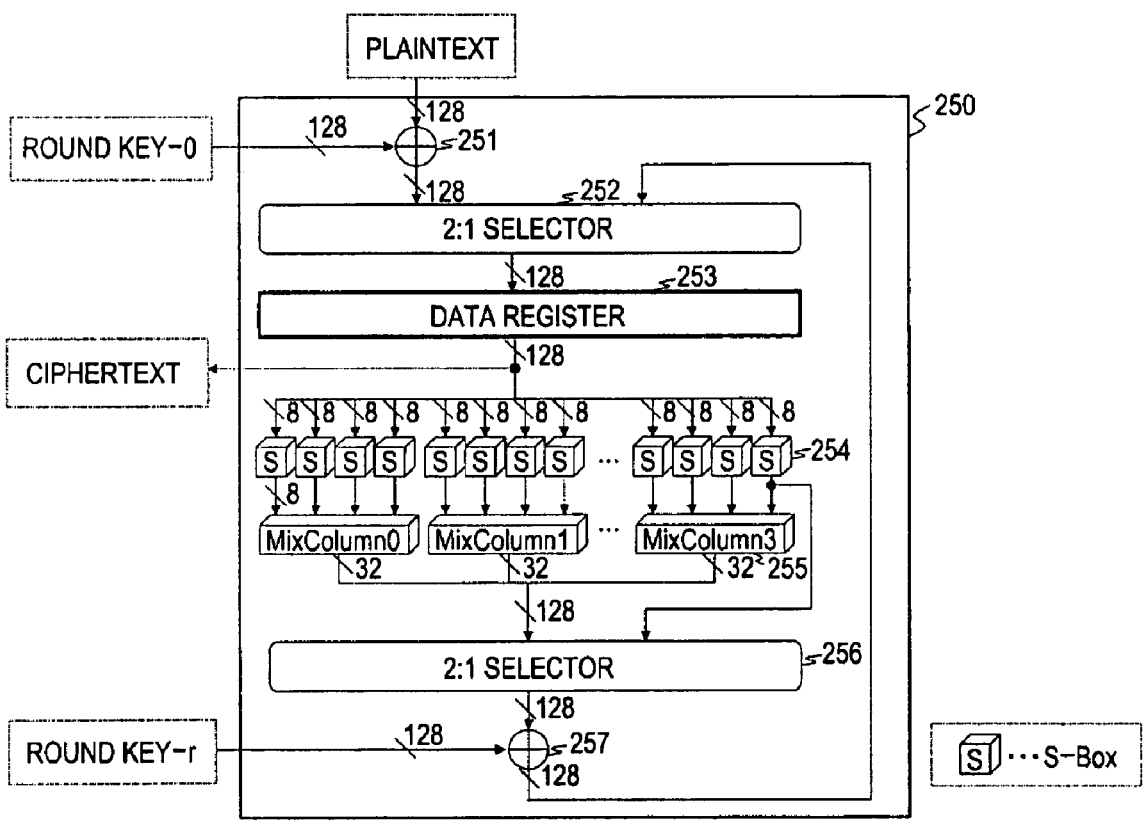
FIG. 3 illustrates an example of a hardware configuration to execute an AES encryption process.

The round operation is performed repeatedly, as described above. In a case where the AES cryptographic processing unit is implemented by hardware, a single round operation unit is disposed in the AES cryptographic processing unit, and the round operation is performed repeatedly by this single round operation unit. FIG. 3 illustrates an example of an AES cryptographic processing unit implemented by hardware.

In the example shown in FIG. 3, if a first round key-0 is input to the AES cryptographic processing unit 250, an exclusive OR gate 251 calculates the exclusive OR between the round key-0 and data (128 bits) to be encrypted. The resultant data is supplied to a register 253 via a selector 252. The data is then divided into a plurality of segments each including 8 bits and supplied to S-boxes 254. The S-boxes 254 perform a nonlinear conversion process on the respective 8-bit data. Resultant data are supplied to mix-column units 255. The mix-column unit 255 exchanges bit values in the received data. The resultant data is supplied to an exclusive OR gate 257 via a selector 256. The exclusive OR gate 257 determines the exclusive-OR between the received data and the round key. The result is returned to the register 253 via the selector 252 and again input to the S-box 254. Thus, the process is performed repeatedly. When a predetermined number of rounds have been performed, ciphertext obtained as a result of the above process is output from the register 253.

In each S-box serving as the nonlinear conversion unit in the round operation unit, if 8-bit data is given, the nonlinear conversion is performed on the given 8-bit data in accordance with the nonlinear conversion table (S-box table) thereby producing 8-bit output data. Because each of 16 S-boxes produces 8-bit nonlinear-converted data, output data including a total of 128 (16×8) bits is obtained as a result of the nonlinear conversion. FIG. 4 illustrates an example of a conversion table (S-box table) used in the nonlinear conversion process.

In the conversion table shown in FIG. 4, low-order 4 bits (0, 1, 2, ..., d, e, f) of input 8-bit data to be converted are described in hexadecimal in a horizontal row at the top. 0 to f in hexadecimal correspond to 0000 to 1111 in binary. High-order 4 bits (0, 1, 2, ..., d, e, f) of input 8-bit data to be converted are described in hexadecimal in a leftmost vertical column. The conversion table indicates 8-bit output values for respective 8-bit input values each given by an intersection of a high-order 4-bit value and a low-order 4-bit value in the conversion table.

That is, 8-bit input data can take 256 different bit values from 00 to FF (00000000 to 11111111). Each 8-bit value is expressed by a combination of high-order 4 bits and low-order 4 bits, and described in the table shown in FIG. 4.

For example, for an input of 00 in hexadecimal (00000000 in binary), 63 in hexadecimal is output according to the conversion table shown in FIG. 4. That is, a value "63" at the upper left of the table is selected as the output value. In a case where C0 (in hexadecimal) is given as an input, BA (in hexadecimal) is output according to the table shown in FIG. 4. As described above, in the nonlinear conversion process performed by the round operation unit, each input 8-bit value is converted into an output 8-bit value according to 1-to-1 mapping described in the conversion table shown in FIG. 4.

2. General Configuration of Nonlinear Conversion Unit (S-Box) Using BDD

Figure 5:
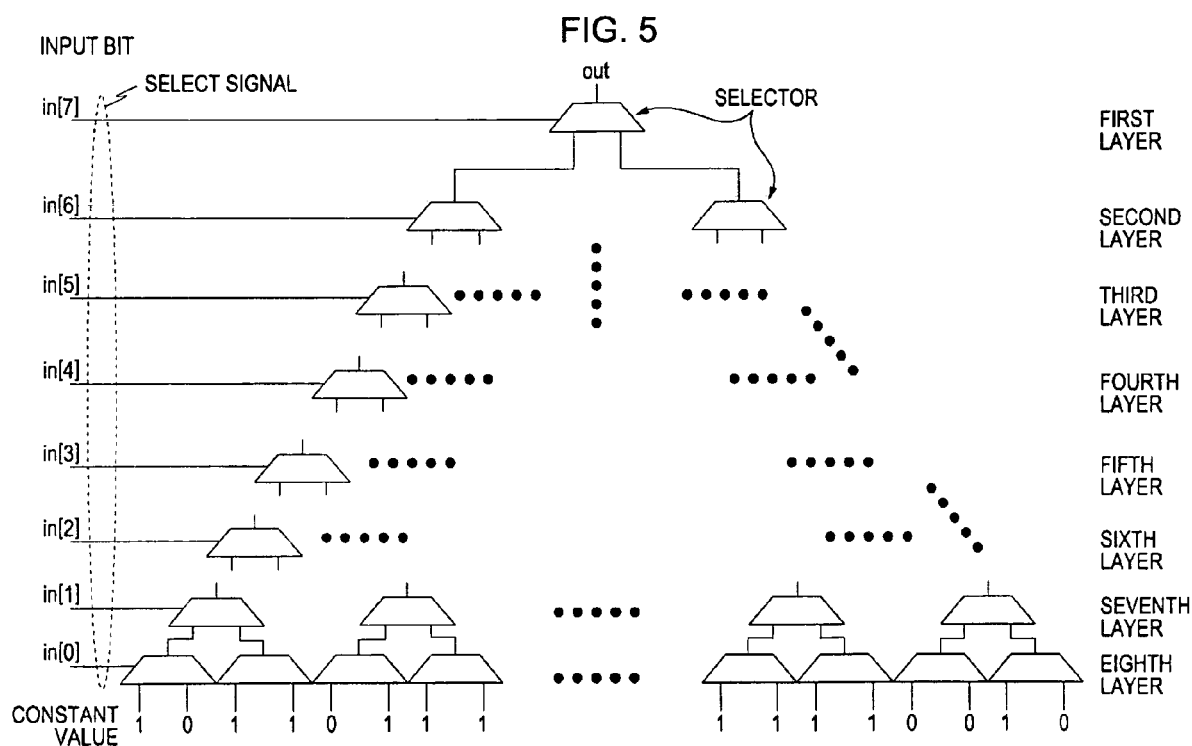
FIG. 5 illustrates an example of a binary decision diagram (BDD) implemented by a logic circuit to output low-order one bit of complete output data obtained as a result of a nonlinear conversion according to a nonlinear conversion table (S-box table)

The function of the conversion according to such a nonlinear conversion table (S-box table) may be implemented, for example, by a hardware circuit based on a binary decision diagram (BDD). FIG. 5 illustrates an example of a binary decision diagram (BDD) implemented by a logic circuit to output low-order one bit of total converted data according to the nonlinear conversion table (S-box table).

In the example shown in FIG. 5, selectors each implementing a 2-input to 1-output logical function are disposed hierarchically in first to eighth layers so as to realize the binary decision diagram (BDD) in the form of a logic circuit. The selectors disposed in the respective first to eighth layers of a pyramid-like hierarchical structure are connected from one layer to another. A 1-bit value is finally output from a selector disposed in the first layer.

One selector is disposed in the first layer, two selectors in the second layer, four selectors in the third layer, eight selectors in the fourth layer, sixteen selectors in the fifth layer, thirty two selectors in the sixth layer, sixty four selectors in the seventh layer, and one hundred and twenty eight selectors in the eighth layer, and thus a total of 255 selectors are disposed.

Outputs from the second layer are input to the selector in the first layer. Outputs from the third layer are input to the selectors in the second layer. Outputs from the fourth layer are input to the selectors in the third layer. Outputs from the fifth layer are input to the selectors in the fourth layer. Outputs from the sixth layer are input to the selectors in the fifth layer. Outputs from the seventh layer are input to the selectors in the sixth layer. Outputs from the eighth layer are input to the selectors in the seventh layer. A constant value of "0" or "1" is input to the selectors in the eighth layer.

A total of 256 constant values of "0" or "1" (256-bit data) input to the selectors in the eighth layer are determined according to the nonlinear conversion table (S-box table) shown in FIG. 4.

The logic circuit shown in FIG. 5 functions as a selection circuit which outputs a least significant bit of 8-bit data obtained as a result of the nonlinear conversion. In this selection circuit, a 256-bit value (10110111 ... 11110010) input to the selectors in the eighth layer shown at the bottom of FIG. 5 is given by a set of least significant bits of each of 256 output values (63, 7C, 77, ..., 54, BB, 16) in the table shown in FIG. 4.

For example, a bit value ("1") at the leftmost position of the input to the selectors in the eighth layer at the bottom of FIG. 5 corresponds to the least significant bit of an output value ("63") at the leftmost position in the top row in the table shown in FIG. 4, while a bit value ("0") at the rightmost position of the input to the selectors in the eighth layer at the bottom of FIG. 5 corresponds to the least significant bit of an output value ("16") at the rightmost position in the bottom row in the table shown in FIG. 4.

FIG. 6 shows a conversion table indicating only least significant bits of respective 256 output values (63, 7C, 77, ..., 54, BB, 16) indicated in the table shown in FIG. 4. That is, the table shown in FIG. 6 indicates least significant bits of respective 256 (16×16) output values (63, 7C, 77, ..., 54, BB, 16) indicated in the table shown in FIG. 4, and these bit values in the table shown in FIG. 6 are set as values input to the selectors in the eighth layer in the circuit shown in FIG. 5.

Select signals input to the selectors in the respective layers are given by one of 8-bit segments of the input data with the total of 128 bits being subjected to the nonlinear conversion. More specifically, a most significant bit (in[7]) of the input 8-bit data is input as the select signal to the selector in the first layer, a second bit (in[6]) of the input 8-bit data is input as the select signal to the selectors in the second layer. In the following layers, select signals are similarly input. Finally, a least significant bit (in[0]) is input as the select signal to the selectors in the eighth layer.

The input 8-bit data is sequentially selected from 8-bit segments obtained by dividing the 128-bit data being subjected to the nonlinear conversion. Thus, the nonlinear conversion process is performed segment by segment.

When the select signal input to a particular select is "0", an input on the left-hand side of the selector is selected and output to a selector in a higher layer. When the select signal input to a particular select is "1", an input on the right-hand side of the selector is selected and output to a selector in a higher layer. Thus, if 8 bits of the select signal are determined, a corresponding one of the 256 inputs to the selectors in the eighth layer is output. A set of select signals input to the first to eighth layers uniquely determines which one of constant values input to the selectors in the eighth layer is finally selected and output.

For example, in a case where "00000000" is given as an input 8-bit data being subjected to the nonlinear conversion, all bits of the select signal are "0". As a result, an input at the left-hand side is selected in all selectors and output to higher layers. Thus, a bit value "1" at the leftmost position of the input to the selectors in the eighth layer at the bottom of FIG. 5 is output as a final value from the selector in the first layer. This output value corresponds to the least significant bit of the output value ("63") at the leftmost position in the top row in the table shown in FIG. 4. As described above, depending on the bit values (00000000 to 11111111) of the data being subjected to the nonlinear conversion, one of 256 values input to the selectors in the eighth layer is output. The 256 values input to the selectors in the eighth level are given by a combination of least significant bits of the respective 256 output values (63, 7C, 77, ..., 54, BB, 16) in the table shown in FIG. 4.

By providing eight circuits including selectors disposed in a hierarchical structure similar to that shown in FIG. 5, it is possible to determine all 8 bits of the output value selected from 256 possible values (63, 7C, 77, ..., 54, BB, 16) shown in the table of FIG. 4.

In the circuit shown in FIG. 5, the 256-bit value (101101 11 ... 11110010) input to the selectors in the eighth layer at the bottom of FIG. 5 is given, as described above with reference to FIG. 6, by a combination of least significant bits of respective 256 output values (63, 7C, 77, . . . , 54, BB, 16) in the table shown in FIG. 4.

If the 256-bit value input to the selectors in the eighth layer at the bottom is given by a combination of second bits of respective 256 output values (63, 7C, 77, . . . , 54, BB, 16) in the table shown in FIG. 4, then the value of the second bit of the output value is obtained. Similarly, third to eighth bits of the output value can be obtained. If the first to eighth-bit values obtained in this manner are combined together, an eight-bit output value, which corresponds to a value obtained by converting a given 8-bit value according to the nonlinear conversion table shown in FIG. 4, is obtained.

Thus, when an input value is given, the circuit configured in the above-described manner is capable of outputting a value corresponding to that obtained via the nonlinear conversion according to the table (S-box table) shown in FIG. 4. In other words, the conversion defined by the nonlinear conversion table (S-box table) such as that shown in FIG. 4 can be implemented by a logical function defined by a binary decision diagram (BDD) such as that shown in FIG. 5.

In the logic circuit shown in FIG. 5, as described above, one selector is disposed in the first layer, two selectors in the second layer, four selectors in the third layer, eight selectors in the fourth layer, sixteen selectors in the fifth layer, thirty two selectors in the sixth layer, sixty four selectors in the seventh layer, one hundred and twenty eight selectors in the eighth layer, and thus a total of 255 selectors are disposed. Each selector may be configured, for example, as shown in FIG. 7.

Figure 7:
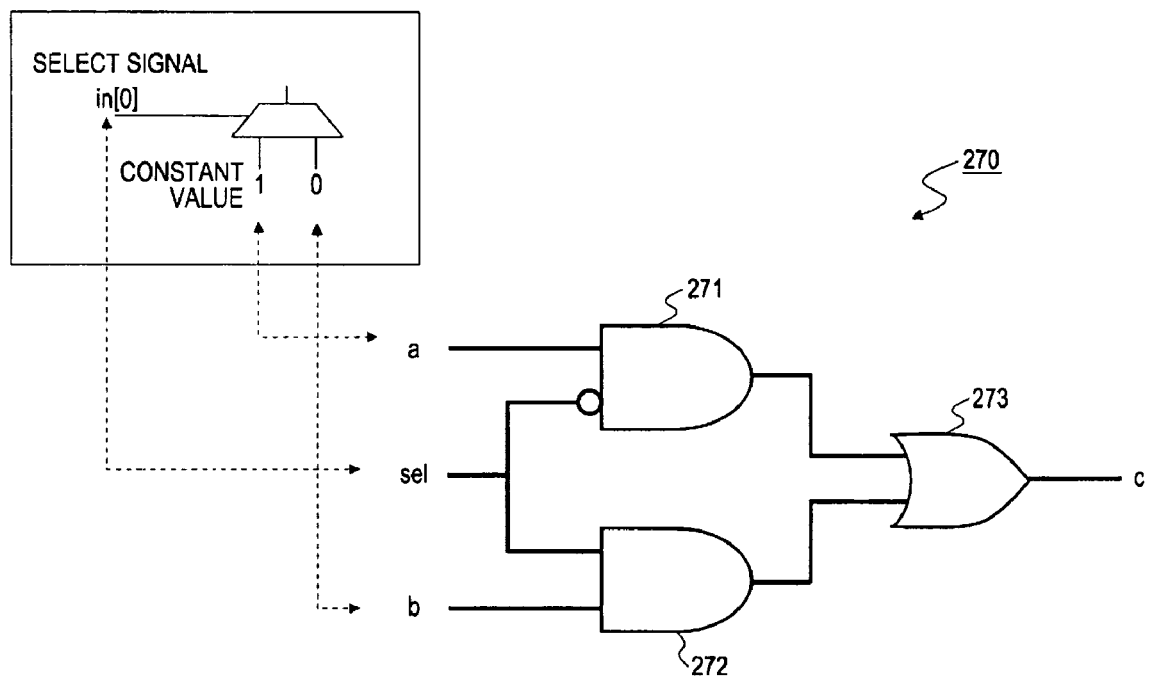
FIG. 7 illustrates an example of a configuration of a selector used in a nonlinear conversion logic circuit.

In the example shown in FIG. 7, the selector 270 includes an AND gate 271, and AND gate 272, and an OR gate 273. A constant value a determined according to the S-box table and an inverted signal of a select signal are input to the AND gate 271. A constant value b determined according to the S-box table and the select signal are input to the AND gate 272. The output of the AND gate 271 and the output of the AND gate 272 are input to the OR gate 273.

When the select signal input to the selector is "0", the constant value "a" input to the selector is selected and output. However, when the select signal input to the selector is "1", the constant value "b" input to the selector is selected and output.

Selectors similar in configuration to that shown in FIG. 7 are disposed in the respective layers of the binary decision diagram such as that shown in FIG. 5 so that outputs are sequentially determined from the lowest layer to higher layers. In this configuration using such selectors, however, a transient change in signal level can occur due to a fluctuation of an input timing of the select signal in each layer.

Figure 8:
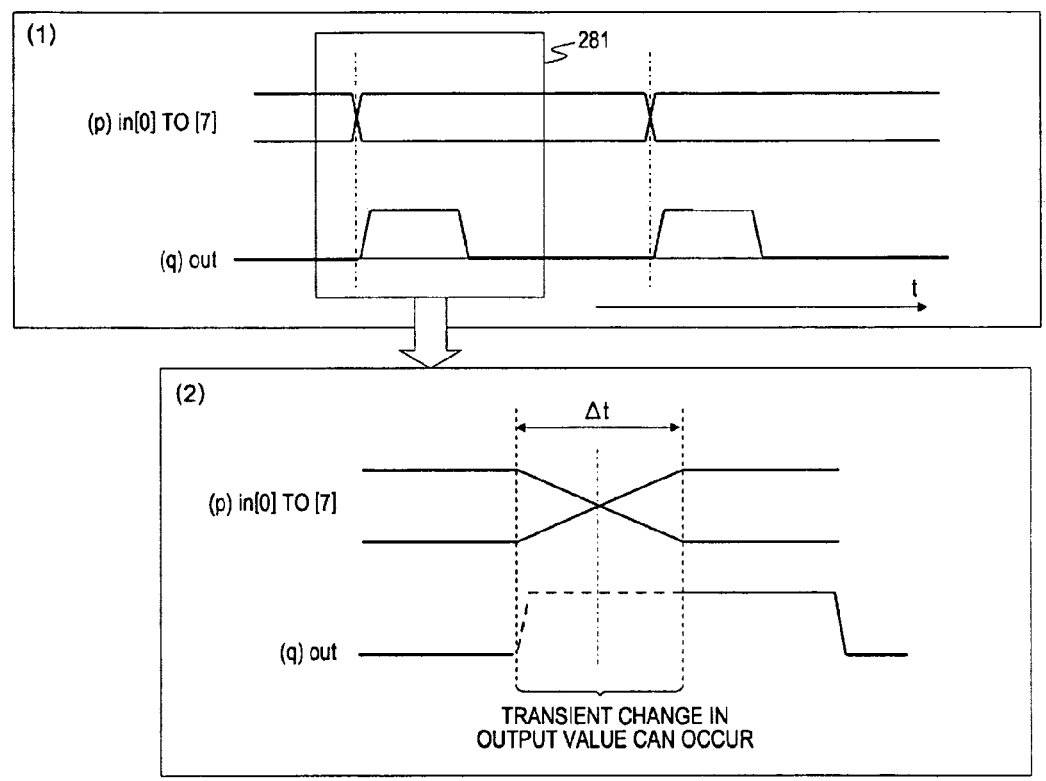
FIG. 8 includes FIGS. 8A and 8B that are diagrams for explanation of transient changes of signals.

The transient change in signal level is described below with reference to FIG. 8. In FIG. 8, part (1) illustrates a timing chart of transitions of select signals ((p) into in[7]) input in the respective layers and a transition of a final selector output ((q) out) in the logic circuit using the binary decision diagram (BDD) shown in FIG. 5. In FIG. 8, part (2) shows, in an enlarged fashion, a part 281 in (1) of FIG. 8. Transitions occurs in respective eight select signals ((p) into in[7]) input to the respective eight layers (first to eighth layers) in the logic circuit shown in FIG. 5, as shown in (2) of FIG. 8. It is difficult to change the eight select signals ((p) into in[7]) at the exact same time, and differences can occur in transition timing among the eight select signals.

Therefore, a certain period of time is needed for all input 8 bits to complete the transitions after transitions started. In (2) of FIG. 8, this transition period is denoted by Δt. The signal level of the output ((q) out) shown in (2) of FIG. 8 varies depending on the states of the input 8 bits of the respective 8 selector layers. In a range in which the output signal (q) is represented by a broken line in (2) of FIG. 8, a change can occur in the level of the output signal (q) due to fluctuations of transition timing of the select signals.

There is a possibility that signal values used in the logic circuit based on the binary decision diagram (BDD) are revealed by analyzing changes in the level of the output signal. As described above in the section of "Description of the Related Art", there is possibility that secret information is revealed by a DPA attack based on the analysis of the transient changes of the output.

As described above, in the WDDL (Wave Differential Dynamic Logic) technique to prevent transient changes in signals from occurring, it is necessary to determine the circuit pattern layout such that there is no difference in propagation delay between each complementary signals. If there is a significant difference in propagation delay between two inputs in the operation, it is difficult to perfectly protect secret information from the DPA attack or the like.

3. First Example of Nonlinear Conversion Unit According to the Invention

As a first example, the present invention provides a configuration of a logic circuit serving as the nonlinear conversion unit (S-box) capable of performing the operation with minimized delay differences without having unnecessary transient changes in signals, as described below.

More specifically, the first example described below is a cryptographic processing apparatus adapted to perform a cryptographic process according to a common key block cipher algorithm, and the cryptographic processing apparatus includes a logic circuit serving to produce an output bit by performing a nonlinear conversion process on input bits, and a control unit which controls the operation such that the input bits supplied to the logic circuit are switched in the pre-charge phase in which the output of the logic circuit is maintained at a fixed value. If the switching of the input bits is completed, the control unit switches the operation phase from the pre-charge phase to the evaluation phase. In the evaluation phase, the nonlinear conversion process is performed on the input bits and an output bit obtained as a result of the nonlinear conversion process is output.

Figure 9:
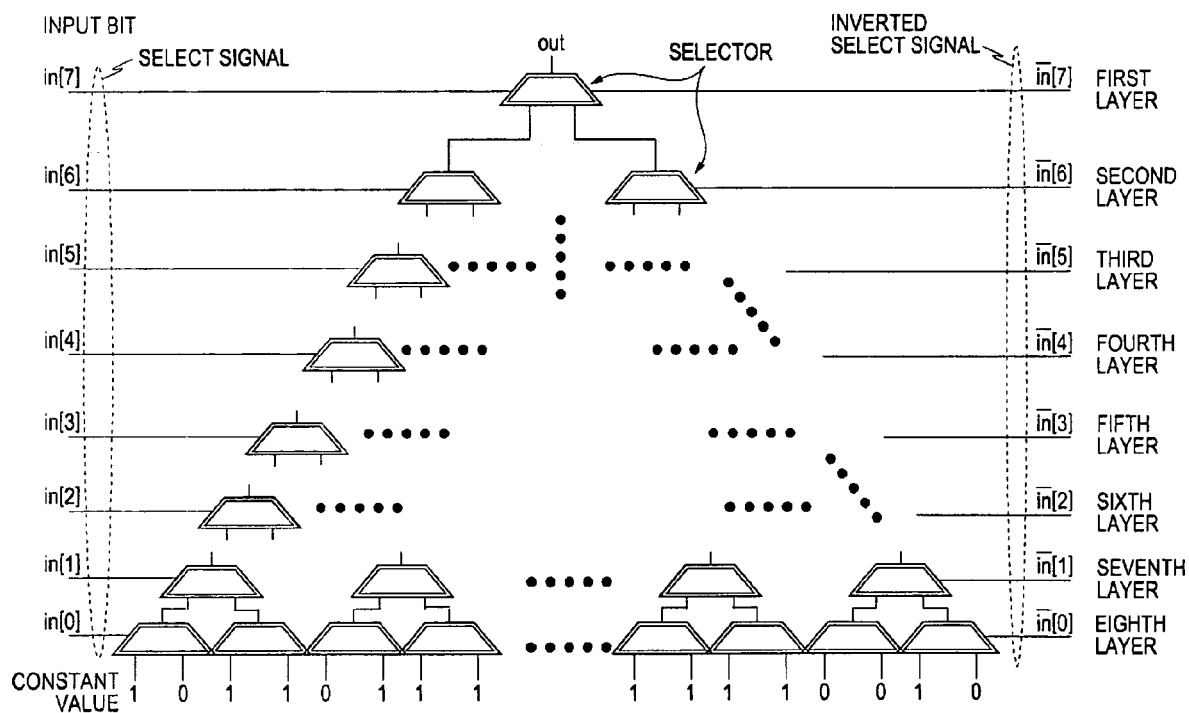
FIG. 9 illustrates an example of a logic circuit configured to be operable in a pre-charge phase and an evaluation phase.

FIG. 9 illustrates a basic configuration of a binary decision diagram (BDD) in the form of a pyramid-like hierarchical selector structure adapted to implement the nonlinear conversion. As shown in FIG. 9, the logic circuit using S-boxes according to the present embodiment is configured by selectors disposed in 8 layers in the form of a pyramid-like structure in a similar manner to the binary decision diagram (BDD) in the form of the pyramid-like selector structure described above with reference to FIG. 5. To the selectors in the eighth layer at the bottom, constant values similar to those input to the selectors in the eighth layer in FIG. 5 are input. More specifically, the constant values are given by a combination of one of first to eighth bits of respective 256 output values (63, 7C, 77, . . . , 54, BB, 16) in the table shown in FIG. 4.

Figure 10:
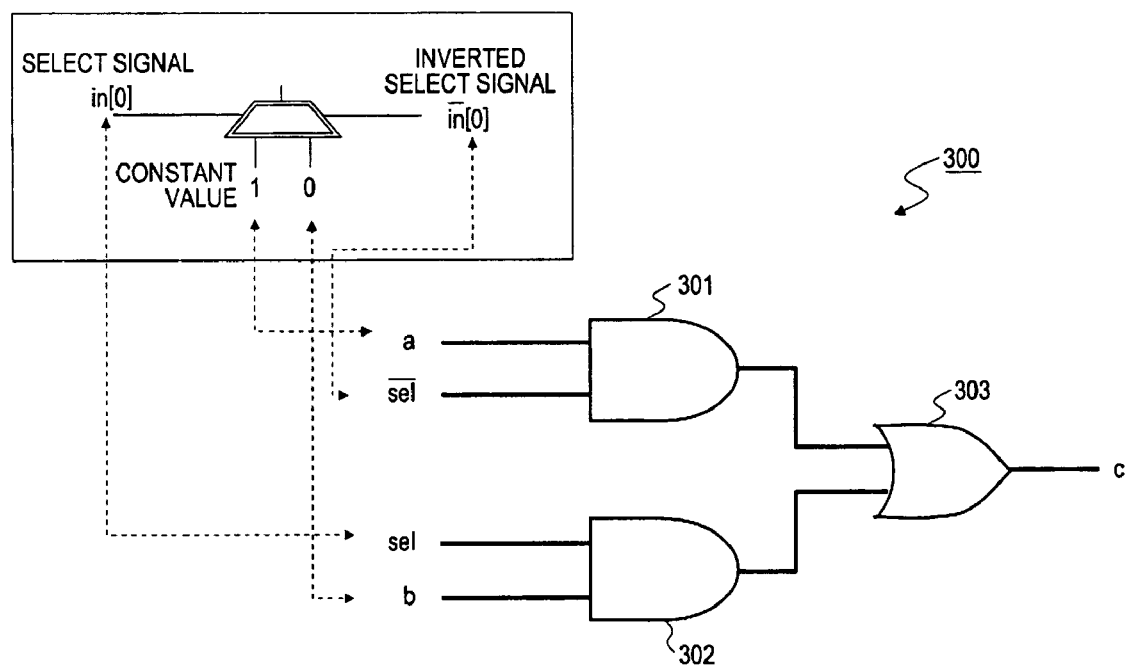
FIG. 10 illustrates an example of a configuration of a selector used in a nonlinear conversion logic circuit.

In the logic circuit shown in FIG. 9, one selector is disposed in the first layer, two selectors in the second layer, four selectors in the third layer, eight selectors in the fourth layer, sixteen selectors in the fifth layer, thirty two selectors in the sixth layer, sixty four selectors in the seventh layer, one hundred and twenty eight selectors in the eighth layer, and thus a total of 255 selectors are disposed. As shown in FIG. 9, a select signal and an inverted selected signal are input to each selector. FIG. 10 illustrates an example of a configuration of the selector.

In the example shown in FIG. 10, the selector 300 includes an AND gate 301, an AND gate 302, and an OR gate 303. A constant value a determined according to the S-box table and an inverted select signal are input to the AND gate 301. A constant value b determined according to the S-box table and a select signal are input to the AND gate 302. The output of the AND gate 301 and the output of the AND gate 302 are input to the OR gate 303.

In the selector 300, unlike the selector 270 described above with reference to FIG. 7, the select signal and the inverted signal are input independently. That is, in the selector 300 shown in FIG. 10, four signals input to the AND gates 301 and 302 are independent of each other. In contrast, in the case of the selector 270 shown in FIG. 7, the inverted select signal input to the AND gate 271 and the select signal input to the AND gate 272 are produced from the same single select signal.

Also in this selector 300 shown in FIG. 10, when the select signal input to the select is "0", the constant value "a" input to the selector is selected and output as the output signal C, while when the select signal input to the selector is "1", the constant value "b" input to the selector is selected and output as the output signal C.

Figure 11:
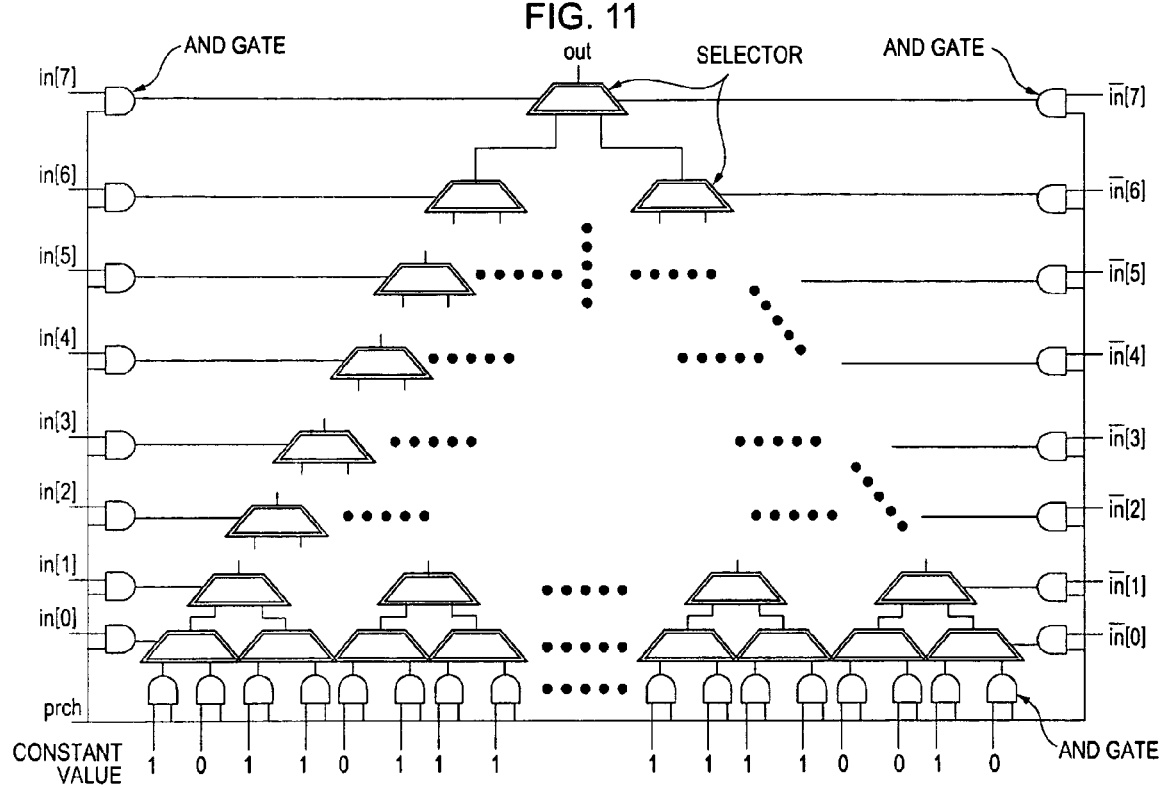
FIG. 11 illustrates an example of a logic circuit configured to perform a nonlinear conversion process according to an embodiment of the invention.

FIG. 11 illustrates a specific example of a logic circuit configuration serving as S-boxes which perform the nonlinear conversion process based on the binary decision diagram (BDD), according to the present embodiment of the invention. In this circuit shown in FIG. 11, each selector is configured such that a select signal and an inverted signal input to the selector are controllable independently.

As shown in FIG. 11, the logic circuit for performing the nonlinear conversion process according to the present embodiment of the invention includes AND gates connected to respective inputs of the selectors in the eighth layer, AND gates connected to respective select signal input terminals of the selectors, and AND gates connected to respective inverted select signal input terminals of the selectors. 256 values are input via 256 AND gates to the selectors in the eighth level. One of inputs of the respective 256 AND gates are supplied with the same constant values as those input to the selectors in the eighth layer shown in FIG. 5. More specifically, the constant values are given by a combination of one of first to eighth bits of respective 256 output values (63, 7C, 77, . . . , 54, BB, 16) in the table shown in FIG. 4.

On the other hand, the select signals input to the selectors in the respective layers are given by one of 8-bit segments of the input data with the total of 128 bits being subjected to the nonlinear conversion, such that a most significant bit (in[7]) of the 8-bit segment is input as the select signal to the selector in the first layer via an AND gate, a second bit (in[6]) of the 8-bit segment is input as the select signal to the selector in the second layer via an AND gate, and, in the following layers, select signals are similarly input via AND gates. Finally, a least significant bit (in[0]) of the 8-bit segment is input as the select signal to the selectors in the eighth layer via an AND gate.

As described above, the input 8-bit data is sequentially selected from 8-bit segments obtained by dividing the 128-bit data being subjected to the nonlinear conversion. Thus, the nonlinear conversion process is performed segment by segment.

In addition to the select signals, inverted select signals are also input to the selectors via AND gates.

As described above, the logic circuit according to the present embodiment includes AND gates connected to respective inputs of the selectors in the eighth layer to which constant values are input, AND gates connected to respective select signal input terminals of the selectors, and AND gates connected to respective inverted select signal input terminals of the selectors, and data are input such that data is input to the selectors in the eighth layer via AND gates, the select signals are input to the respective selectors via AND gates, and the inverted select signals are input to the respective selectors via AND gates. The circuit configuration described above makes it possible for the logic circuit to have the pre-charge phase and the evaluation phase. The switching between the phases, setting of information input to the logic circuit, and switching of information input to the logic circuit are controlled by the control unit not shown in the figure.

In the circuit configuration shown in FIG. 11, as with the circuit configuration shown in FIG. 5, the constant values input to the selectors in the eighth layer are given, as described above with reference to FIG. 6, by a combination of least significant bits of respective 256 output values (63, 7C, 77, . . . , 54, BB, 16) in the table shown in FIG. 4. Thus, the logic circuit shown in FIG. 11, as with the logic circuit shown in FIG. 5, outputs a least signification bit of an output 8-bit data obtained as a result of the nonlinear conversion process.

As shown in FIG. 11, a pre-charge signal (prch) is input to the other input terminal of each of the 256 AND gates connected to the respective selectors in the eighth layer, the other input terminal of each of the 8 AND gates connected to the respective select signal input terminals of the selectors in the respective layers, and the other input terminal of each of the 8 AND gates connected to the respective inverted select signal input terminals of the selectors in the respective layers. When the pre-charge signal (prch) is "0", the 256 values input to the selectors in the eighth layer, the select signal input to the selectors in the respective layers, and the inverted select signal input to the selectors in the respective layers are all become "0". This state is called a pre-charge phase state. That is, in the pre-charge phase, all selector inputs are set to "0".

When the pre-charge signal (prch) is "1", the constant values are input to the selectors in the eighth layer, and the select signals and the inverted select signals are input to the selectors via the AND gates. Note that as described above, the select signals input to the selectors in the respective layers are given by one of 8-bit segments of the input data with the total of 128 bits being subjected to the nonlinear conversion, and the inverted select signals are given by inverting the select signals. This state is called an evaluation phase state.

In the present embodiment, the operation in the evaluation phase and the operation in the pre-charge phase are performed alternately. In the evaluation phase, the output value is determined using the selectors disposed in the 8 layers, while all input values are set to "0" in the pre-charge phase.

Figures 12A, 12B:
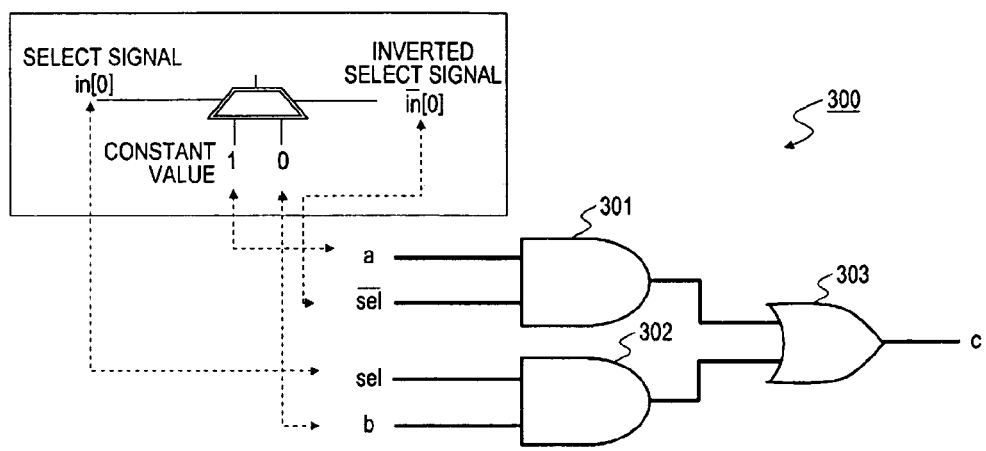
FIGS. 12A and 12B illustrate an example of a manner in which signals in a logic circuit are switched according to an embodiment of the present invention.

The values input to the respective selectors change in a manner as described below with reference to FIGS. 12A and 12B. FIG. 12A illustrates the configuration of the selector 300, and FIG. 12B illustrates changes in signals input to the selector 300. In the selector 300 shown in FIG. 12A, a constant value "a" determined according to the S-box table and an inverted select signal are input to the AND gate 301, a constant value "b" determined according to the S-box table and a select signal are input to the AND gate 302, and the output of the AND gate 301 and the output of the AND gate 302 are input to the OR gate 303.

FIG. 12B illustrates, in the form of a table, temporary changes in signals input to the selector 300. In this table, time elapses from left to right, and the phase is switched with time. The signals input to the selector are switched in response to the change in phase. As described above, in the logic circuit according to the present embodiment of the invention, the operation in the pre-charge phase and the operation in the evaluation phase are performed alternately such that all signals input to the selector are set to 0 in the pre-charge phase, and the correct constant values, the select signals, and the inverted signals are input to the selector and the output bit is calculated in the evaluation phase.

FIG. 12B illustrates temporary changes in signals input to the selector, that is, the constant value "a", the constant value "b", the select signal, and the inverted select signal. These signals are input to the selector via one of the AND gates, while the other input terminal of each AND gate is supplied with the pre-charge signal which takes "0" in the pre-charge phase and "1" in the evaluation phase.

In a first pre-charge phase, the pre-charge signal is set to "0", and thus all signals input to the selector become "0". In a following evaluation phase, the pre-charge signal is set to "1" so that the correct constant values, select signal, and inverted select signal are input to the selector. In the evaluation phase, other selectors in the respective layers operate in a similar manner, and thus a value corresponding to a set of 8 select signals (8-bit data) is output from the selector in the first layer (at the top).

After the evaluation phase, the operation phase again switched o the pre-charge phase, and all values input to the selector are set to "0". In this pre-charge phase period, the select signals and the inverted select signals are switched to a next set of values (8 bit data). After the pre-charge phase period has elapsed, the operation phase is switched to the evaluation phase, a value corresponding to a new set of 8 select signals (8-bit data) is output from the selector in the first layer (at the top).

In the above-described operation in which the evaluation phase and the pre-charge phase are switched alternately, the new select signals are input to the selectors in a transition period in which the phase is switched from the pre-charge phase in which all signals input to the selectors are "0" to the evaluation phase. Thus, the changes in the signals input to the selectors in the transition period occur always from "0" to true input values. Therefore, it becomes difficult to detect true data values by analyzing changes in power consumption corresponding to transient changes in signal levels in the eight layers.

More specifically, the select signals to the selectors are switched at a time at which signals have settled into a steady state after the phase was switched into the pre-charge phase in which the selector inputs are all set to "0". Therefore, even if a difference in transition timing occurs among the select signals of the respective layers, the selector outputs are maintained at "0" and thus no change in the output value (out) occurs. Therefore, a transient change in the output value caused by transient changes is undetectable. This prevents secret information from leaking out.

In the present embodiment, after the output value corresponding to a given set of 8 select signals (8-bit data) is determined, all inputs to the selectors are reset to "0". After all inputs are reset, a new set of 8 select signals is input. Thus, in the present embodiment, no change occurs in the output value caused by transient changes in select signals when the select signals are switched. This makes it possible to reduce the possibility for signal values used in the logic circuit based on the binary decision diagram (BDD) to be analyzed, and thus an improvement of resistance to DPA attacks is achieved.

Figure 13:
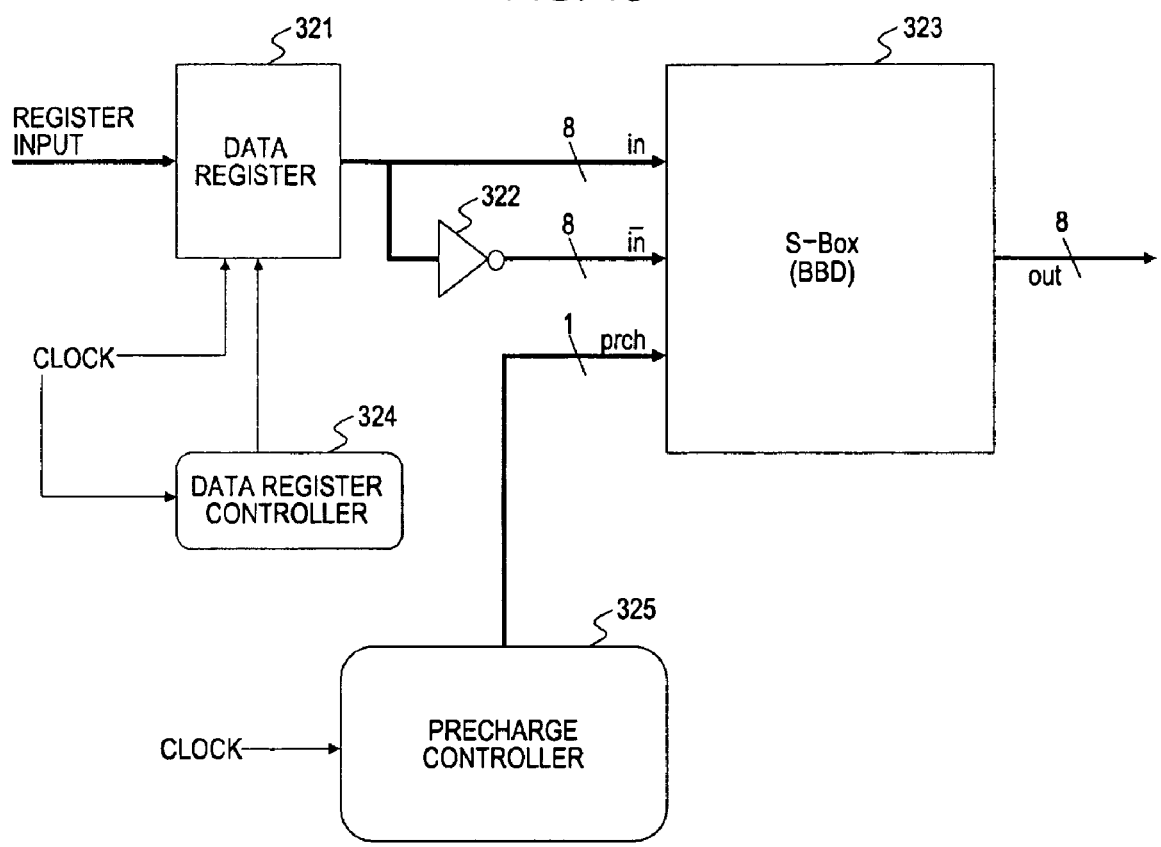
FIG. 13 illustrates an example of a manner of controlling a logic circuit in a nonlinear conversion process according to an embodiment of the present invention.

Now, referring to FIG. 13, switching of the signals input to the S-box (BDD) serving as the nonlinear conversion unit during the operation performed in the evaluation phase and the pre-charge phase appearing alternately is described.

As described above with reference to FIG. 11, in the logic circuit serving as the nonlinear conversion unit, select signals, inverted select signal, and constant values are input to the S-box implementing the binary decision diagram (BDD). In the evaluation phase, true values are input. However, all values are switched into "0" in the pre-charge phase.

In the circuit configured to switch the signals input to the S-box (BBD) shown in FIG. 13, data being subjected to the nonlinear conversion process is input to a data register 321, and 8-bit segments of the input data are sequentially output from the data register 321 under the control of a data register controller 324. Each 8-bit segment data is input as the select signal and the inverted select signal to an S-box (BBD) 323 in the evaluation phase. Note that the inverted select signal is produced by an inverter 322 by inverting the select signal.

In the pre-charge phase, a pre-charge controller 325 outputs a pre-charge signal ("1"). In response to the pre-charge signal, the select signal and the inverted signal are input to selectors in the S-box (BBD) 323 in the evaluation phase. Although not shown in FIG. 13, the pre-charge signal ("1") is also input to one input terminal of each of the AND gates connected to the selectors in the lowest layer in the S-box (BBD) 323 whereby in the evaluation phase, the constant values are input to the selectors in the lowest layer, and the result of the nonlinear conversion for the true input values is output from the S-box (BBD) 323.

In the pre-charge phase, the pre-charge controller 325 outputs a pre-charge signal ("0") to the S-box (BBD) 323 whereby the select signal, the inverted signal, and the values input to the eighth layer are all changed to "0". As a result, all signals input to the selectors in the S-box (BBD) 323 become "0", and "0" is output from the S-box (BBD) 323.

A clock signal is input to the data register controller 324 and the pre-charge controller 325. In response to the clock signal, the pre-charge controller 325 outputs "1" in the evaluation phase whereby the data output from the data register 321 in response to a control signal output from the data register 324 is input as the true input signal to the selectors and processed in the S-box (BBD) 323. As a result, a value indicating the true result of the nonlinear conversion is output. In the pre-charge phase, the pre-charge controller 325 outputs a pre-charge signal "0" whereby inputs to all selectors in the S-box (BBD) 323 become "0", and the output of the S-box (BBD) 323 also becomes "0". Switching of the signals is performs at a transition between phases in synchronization with the clock signal.

Thus, in the present embodiment, as described above, a set of 8 select signals (8-bit data) and 8 inverted select signals is input to the S-box 323 in the evaluation phase. In the pre-charge phase following the evaluation phase, the pre-charge signal "0" is supplied from the pre-charge controller 325 to the S-box 323, whereby all selector inputs are reset to "0". In the following evaluation phase, inputting of new select signals is started from the reset state, and the process described above is performed repeatedly. Thus, in the present embodiment, no change occurs in the output value caused by transient changes in select signals when the select signals are switched. This makes it possible to reduce the possibility for signal values used in the logic circuit based on the binary decision diagram (BDD) to be analyzed, and thus an improvement of resistance to DPA attacks is achieved.

4. Second Example of Nonlinear Conversion Unit (Having Selectors Used in Common) According to the Invention The logic circuit using the binary decision diagram (BDD) shown in FIG. 11 outputs one of 8 bits of the output data. Therefore, to obtain complete 8-bit output data as a result of the nonlinear conversion for input 8-bit data, it is necessary to provide a total of eight logic circuits using the binary decision diagram (BDD) similar to that shown in FIG. 11.

Combining of eight logic circuits using the binary decision diagram (BDD) each serving to output one bit results in an increase in circuit complexity. To reduce the total circuit complexity, some selectors can be replaced by a smaller number of selectors.

Figure 14A:
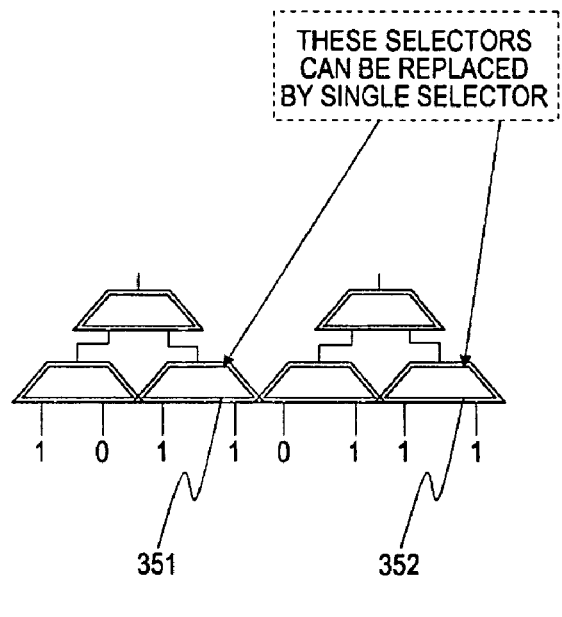
FIG. 14 illustrates an example of a manner in which a plurality of selectors are replaced by a single selector.
Figure 14B:
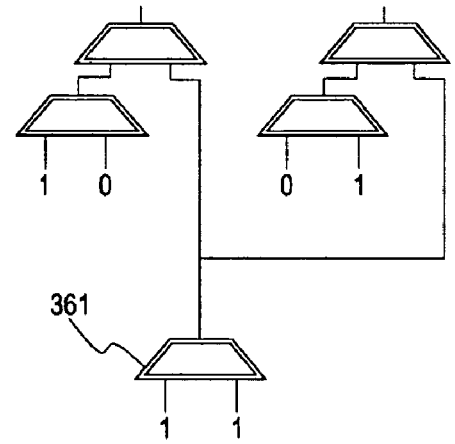

Referring to FIG. 14, an example of a manner of replacing a plurality of selectors by a single selector is described. For example, in a case where a plurality of selectors 351 and 352 have the same input value as shown in FIG. 14A, these selectors can be replaced by a single selector as shown in FIG. 14B. The replacement of a plurality of selectors by a single selector allows a reduction in total circuit complexity of the logic circuit using the binary decision diagram (BDD), and thus a reduction in cost can be achieved. The reduction in circuit complexity results in a reduction in power consumption.

5. Third Example of Nonlinear Conversion Unit (Configured Using Inverting Output Selectors and Inverting Input Selectors) According to the Invention Now, a third example is described of a nonlinear conversion unit configured using inverting output selectors and inverting input selectors. The configuration and the operation of the logic circuit according to the third example are described below with reference to FIG. 15.

The configuration of the logic circuit using binary decision diagram (BDD) according to the third example is different from that according to the first example described above with reference to FIG. 11 in that inverted-output selectors are used in even-numbered layers and inverted-input selectors are used in odd-numbered layers. Because the binary decision diagram (BDD) has 8 layers, inverting occurs an even number of times. Therefore, there is no difference in the final output from the logic circuit between the configuration in which non-inverted input/output selectors are disposed in all 8 layers and the configuration in which inverted-output selectors and inverted-input selectors are disposed depending on the layers.

Use of inverted-output selectors and inverted-input selectors allows a reduction in the total size of the logic circuit compared with that shown in FIG. 11. Thus, a reduction in power consumption is also achieved in addition to the reduction in size.

The logic circuit configured in the above-described manner according to the present embodiment operates as follows.

In the evaluation phase, as in the previous embodiments, the selectors receive true input values for which a true output value of the nonlinear conversion is to be determined. More specifically, 8-bit data, which is one of segments of total data being subjected to the nonlinear conversion, is input as select signals and inverted select signal to the selectors, and constant values determined according to the nonlinear conversion table (S-box table) (for example, the table shown in FIG. 4 or 6) are input to the selectors in the eighth layer.

In the pre-charge phase, as in the previous embodiments, all selector inputs, that is, the select signals, the inverted select signals, and values input to the selectors in the lowest layer are set to "0".

The select signals (in) input to the inverting output selectors and the inverting input selectors are switched in the pre-charge phase in which all selector inputs are set to "0". In the evaluation phase following the pre-charge phase, constant values for which a true output value is to be determined (as a result of the nonlinear conversion process), the select signals, and inverted select signals are input. The pre-charge phase and the evaluation phase are alternately repeated.

In the configuration according to the present embodiment, as with the previous embodiments, all inputs to selectors are reset to "0" in the pre-charge phase, and, in the following evaluation phase, inputting of new select signals is started from the reset state. Thus, resetting of inputs and inputting of new select signals are performed repeatedly. The select signals to the selectors are switched at a time at which signals have settled into a steady state after the phase was switched into the pre-charge phase in which the selector inputs are all set to "0". Therefore, even if a difference in transition timing occurs among the select signals of the respective layers, the selector outputs are maintained at "0" and thus no change in the output value (out) occurs. Therefore, a transient change in the output value caused by transient changes is undetectable. Thus, in the present embodiment, no change occurs in the output value caused by transient changes in select signals when the select signals are switched. This makes it possible to reduce the possibility for signal values used in the logic circuit based on the binary decision diagram (BDD) to be analyzed, and thus an improvement of resistance to DPA attacks is achieved.

6. Fourth Example of Nonlinear Conversion Unit (Using Random Numbers as Inputs) According to the Invention In a fourth example described below, random numbers are input to the nonlinear conversion unit. The configuration and the operation of the nonlinear conversion unit according to the fourth example are described below with reference to FIG. 16.

The configuration of the logic circuit using binary decision diagram (BDD) according to the fourth example of the present invention is different from that according to the first example described above with reference to FIG. 11 in that values input, via one of two input nodes, to the AND gates which determine the input values supplied to the eighth layer are set differently from the first example.

In the first example described above, one of inputs of the respective 256 AND gates are supplied with the same constant values as those input to the selectors in the eighth layer shown in FIG. 5. More specifically, in the first example, the constant values input to the selectors in the eighth layer are given by a combination of one of first to eighth bits of respective 256 output values (63, 7C, 77, . . . , 54, BB, 16) in the table shown in FIG. 4. In the example shown in FIG. 11, the constant values are given, as described above with reference to FIG. 6, by a combination of least significant bits of respective 256 output values (63, 7C, 77, . . . , 54, BB, 16) in the table shown in FIG. 4.

That is, in the first example described above, a total of 256 values ("0" or "1") are extracted from one of first to eighth bits of respective 256 output values (63, 7C, 77, . . . , 54, BB, 16) in the table shown in FIG. 4, and the extracted 256 constant values are directly input to the AND gates. In contrast, in this fourth example, the constant values, the inverted constant values, and random numbers are properly combined, and a resultant values are input to the 256 AND gates.

More specifically, a combination of the following data is used as the input values, (a1) constant values extracted from bit values of a corresponding out value described in the nonlinear conversion table (S-box table) as with the first embodiment described above, (a2) values obtained by inverting the constant values (a1), and (a3) random numbers.

A combination of all of (a1) to (a3) may be used, or a combination of arbitrary two of (a1) to (a3) may be used.

In the present embodiment, management information indicating when, and which one of data (a1) to (a3) was used is stored, and a correct output value is obtained in accordance with the management information. In a case where the inverted constant values (a2) are input, the final output becomes equal to the inversion of the correct output value (when the correct output value is "1", "0" is output, while "1" is output when the correct output value is "0"), and thus it is possible to employ the inverted output value as the correct output value.

Figure 16:
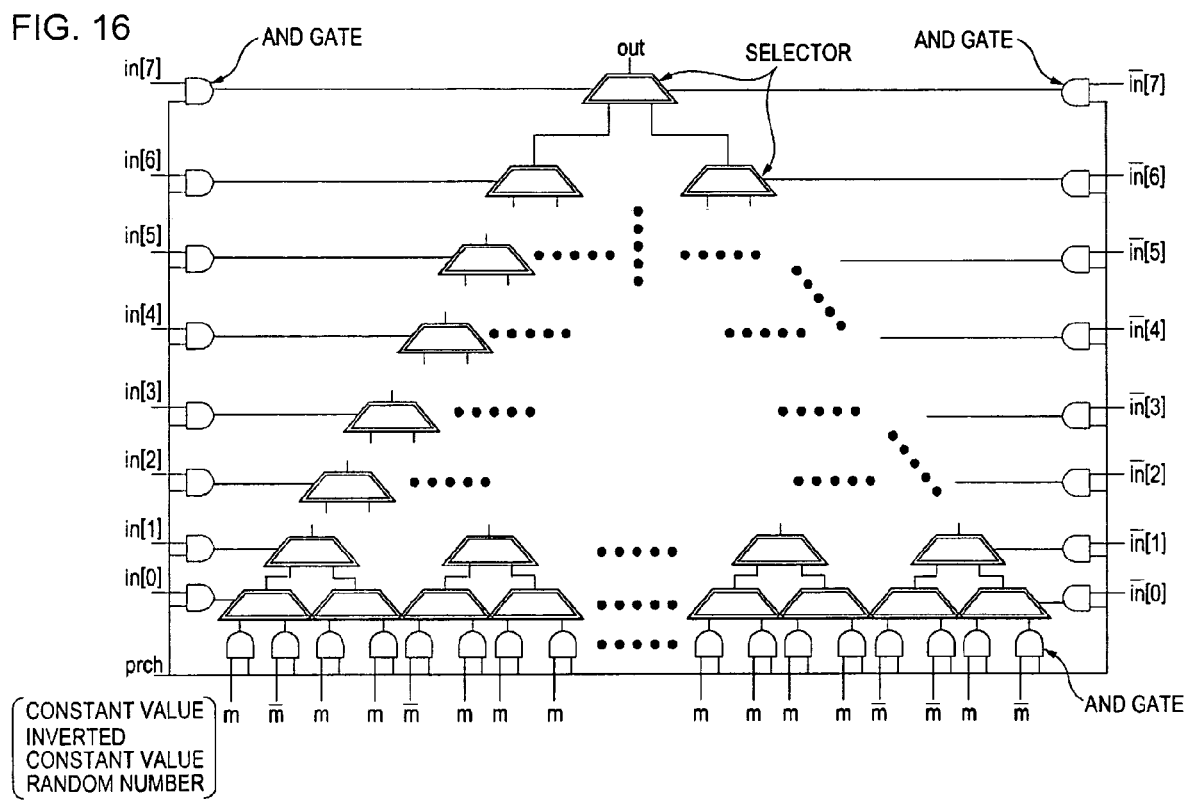
FIG. 16 illustrates an example of a configuration of a logic circuit to which random numbers are input, according to an embodiment of the present invention.

More specifically, for example, in a case where the logic circuit for obtaining the least significant bit of a 8-bit output value of the nonlinear conversion is configured as shown in FIG. 16, the least significant bits of the respective 256 output values (63, 7C, 77, . . . , 54, BB, 16) in the table shown in FIG. 4, that is, bit values 1, 0, 1, 1, 0, . . . , 0, 0, 1, 0 described above with reference to FIG. 6 are input or inverted values thereof, that is, 0, 1, 0, 0, 1, . . . , 1, 1, 0, 1 are input. When the inverted values are input, the inversion of the final output value is used as the correct result of the nonlinear conversion.

In the present embodiment, in addition to the constant values or inverted constant values, random numbers are also input. This causes occurrences of "0" and "1" in the selector outputs to be randomized, which causes the DPA analysis to become further more difficult.

In the present embodiment, in the evaluation phase, the following data is used as the input values, (a1) constant values extracted from bit values of a corresponding out value described in the nonlinear conversion table (S-box table) as with the first embodiment described above, (a2) values obtained by inverting the constant values (a1), and (a3) random numbers. As described above, a combination of all of (a1) to (a3) or a combination of arbitrary two of (a1) to (a3) may be used. The random numbers may or may not be equal for all eight logical functions.

In the pre-charge phase, all selector inputs, that is, the select signals, the inverted select signals, and values input to the selectors in the lowest layer are set to "0".

In the present embodiment, the select signals (in) input to the selectors are switched between the pre-charge phase in which all selector inputs are set to "0", and the evaluation phase in which the select signals or the inverted select signals are set to true values and the values input to the selectors in the bottom layer are given by one of (a1) constant values extracted from bit values of a corresponding out value described in the nonlinear conversion table (S-box table) as with the first embodiment described above, (a2) values obtained by inverting the constant values (a1), and (a3) random numbers.

In the process described above, management information indicating when, and which one of data (a1) to (a3) was used is stored, and a correct output value is obtained in accordance with the management information.

Also in the implementation according to the present embodiment, all inputs to selectors are reset to "0" in the pre-charge phase, and, in the following evaluation phase, inputting of new select signals is started from the reset state. The select signals to the selectors are switched at a time at which signals have settled into a steady state after the phase was switched into the pre-charge phase in which the selector inputs are all set to "0". Therefore, even if a difference in transition timing occurs among the select signals of the respective layers, the selector outputs are maintained at "0" and thus no change in the output value (out) occurs. Therefore, a transient change in the output value caused by transient changes is undetectable. Thus, in the present embodiment, no change occurs in the output value caused by transient changes in select signals when the select signals are switched. This makes it possible to reduce the possibility for signal values used in the logic circuit based on the binary decision diagram (BDD) to be analyzed, and thus an improvement of resistance to DPA attacks is achieved.

7. Fifth Example of Nonlinear Conversion Unit (Including OR Gates) According to the Invention In previous examples, when the select signals input to the respective layers are switched, the pre-charge signal (prch) is set to "0" whereby all selector inputs are reset to "0". Alternatively, when the select signals input to the respective layers are switched, all selector inputs may be set to "1" instead of "0". This also makes the DPA analysis become further more difficult.

Figure 17:
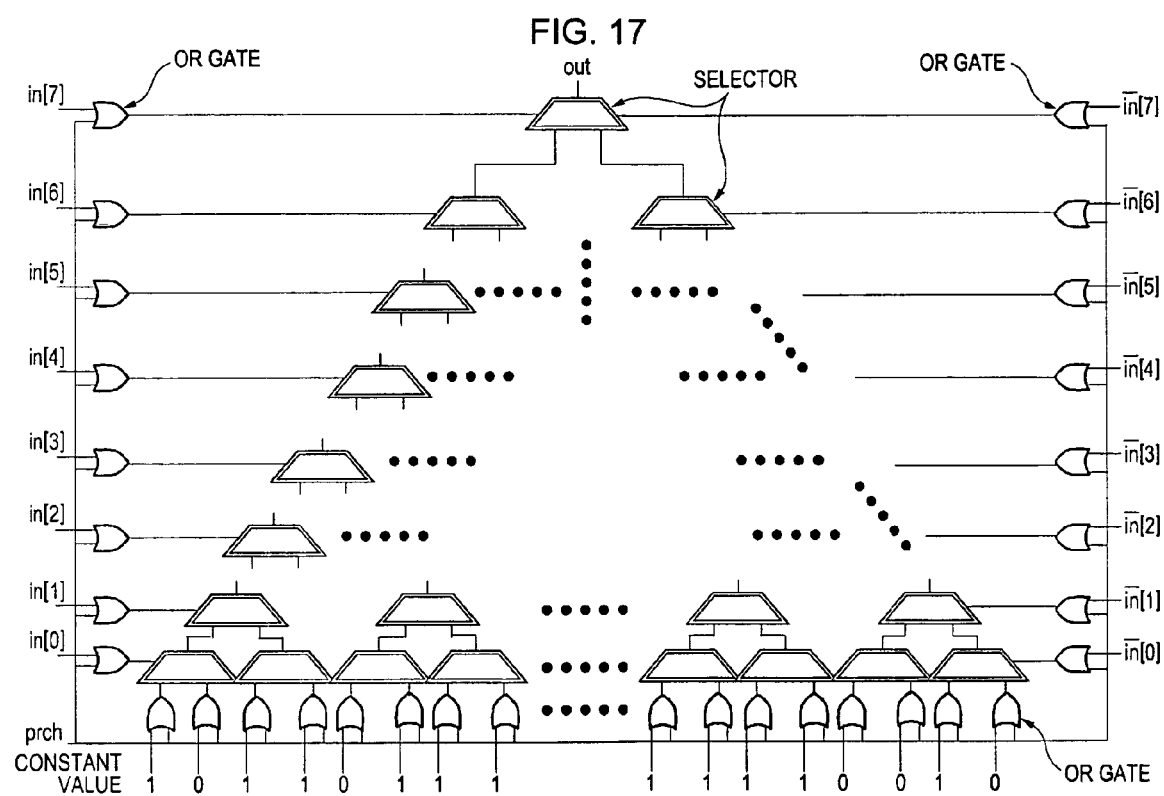
FIG. 17 illustrates an example of a configuration of a logic circuit including OR gates according to an embodiment of the present invention.

FIG. 17 illustrates a configuration of a logic circuit using the binary decision diagram (BDD) according to the present embodiment. In the logic circuit according to the present embodiment, as shown in FIG. 17, OR gates are disposed at locations before the selectors in the bottom layer so that constant values are input to these selectors via the OR gates, at locations before the select signal input terminals so that the select signals are input to selectors via the OR gates, and at location before the inverted select signal input terminals so that the inverted select signals are input to selectors via the OR gates, such that one of inputs of each OR gate is used as an input terminal for receiving the pre-charge signal.

In the present example, as opposed to the previous examples, a pre-charge signal with a level of "1" is used. When the pre-charge signal is input, all selector inputs are switched to "1". In the evaluation phase, the true constant values, the select signals, and the inverted select signals are input to the selectors. As described above, in the present embodiment, unlike the previous embodiments, all signals input to the selectors are at "1" in the reset state.

In this configuration, the select signals (in) to the selectors are switched at a time at which signals have settled into a steady state after the phase was switched into the pre-charge phase in which the selector inputs are all set to "1". Therefore, even if a difference in transition timing occurs among the select signals of the respective layers, the selector outputs are maintained at "1" and thus no change in the output value (out) occurs. Therefore, a transient change in the output value caused by transient changes is undetectable. This prevents secret information from leaking out.

When the select signals to the respective layers are switched, the output may be randomly set to "0" or "1". This can be achieved by controlling the AND gates from which to output signals to be supplied to the eighth layer such that the signals output from the AND gates are selected from the following three combinations of values, a combination of all 1s, a combination of all 0s, and a combination of constant values or random numbers.

The selection of the values output from the AND gates is made, in the pre-charge phase, by switching a switch adapted to randomly select all 0's or all 1's such that selected all 0's or 1's are input to the eighth layer.

Also in this configuration, the select signals (in) to the selectors are switched at a time at which signals have settled into a steady state after the phase was switched into the pre-charge phase in which the selector inputs are all set to "0" or "1". Therefore, even if a difference in transition timing occurs among the select signals of the respective layers, the selector outputs are maintained at "0" or "1", and thus no change in the output value (out) occurs. Therefore, a transient change in the output value caused by transient changes is undetectable. This prevents secret information from leaking out.

One of the examples described above may be directly employed or techniques of a plurality of examples may be combined.

In the examples described above, the invention is applied to the nonlinear conversion process in the common key encryption process. However, the present invention is applicable not only to the common key encryption process using the AES or DES algorithm but also to a wide variety of nonlinear or linear data conversion processes such as a public key cryptography process based on the RSA algorithm or the like, a calculation of a hash function such as SHA-1, etc.

8. Example of Cryptography Processing Apparatus

Finally, an IC module 500 serving as a cryptographic processing apparatus adapted to produce ciphertext or decrypt ciphertext is described below with reference to FIG. 18. The process according to any one of the examples described above may be executed on various kinds of information processing apparatus such as a personal computer, an IC card, a reader/writer, etc., and the IC module 500 shown in FIG. 18 may be used in such an apparatus.

Figure 18:
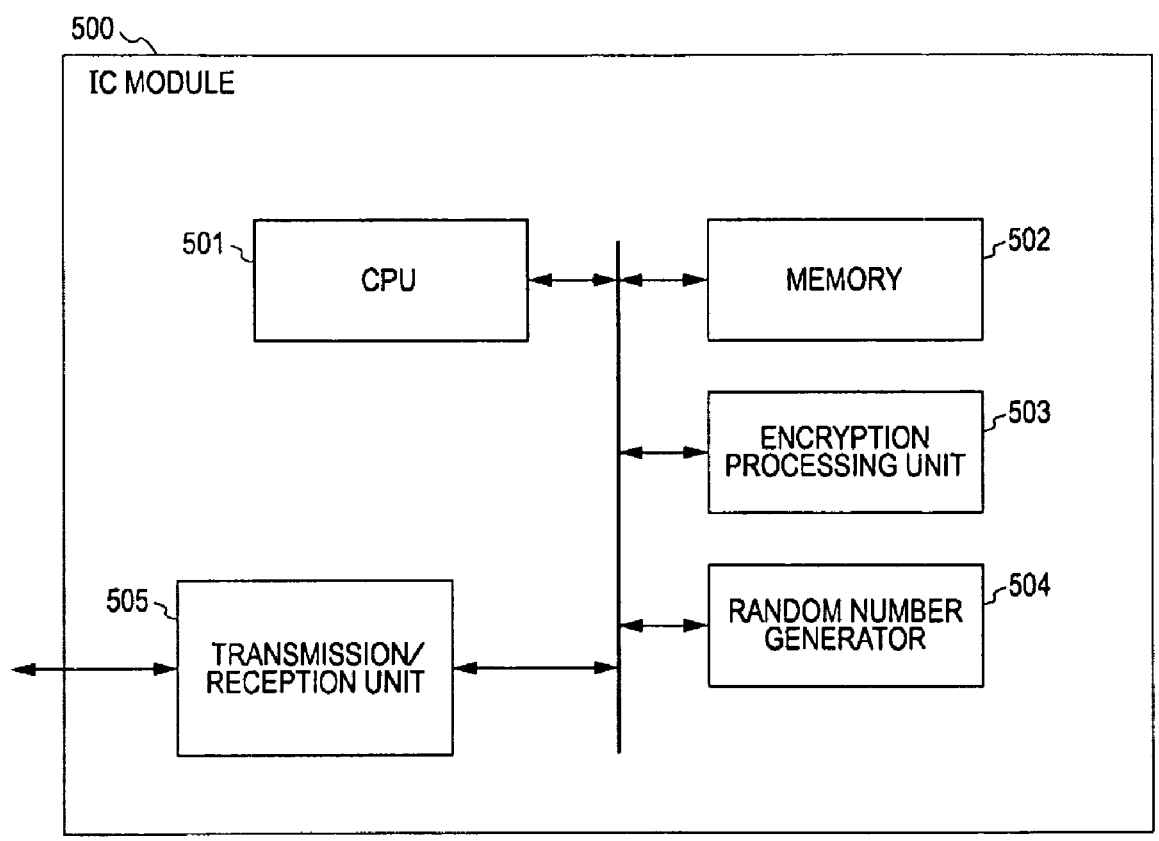
FIG. 18 illustrates an example of a configuration of an IC module serving as a cryptographic processing device according to an embodiment of the present invention.

In the IC module 500 shown in FIG. 18, a CPU (Central processing Unit) 501 is a processor serving as a control unit to control starting/ending of the cryptographic process, transmitting/receiving of data, transferring of data among various parts, etc., and to execute various programs. A memory 502 is a ROM (Read-Only-Memory) for storing programs executed by the CPU 501 and fixed data used in the operation, or a RAM (Random Access Memory) used as a storage area for storing programs executed by the CPU 501 and varying parameters appearing in the operation or used as a work area by the CPU 501. The memory 502 may also be used as a storage area for storing key data such as a secret key (K) or the like used in the encryption process. It is desirable that the data storage area be realized in a form having high resistance to tampering.

The encryption processing unit 503 includes a nonlinear conversion circuit which includes a logic circuit configured using selectors disposed in the form of a hierarchical layer structure according to the binary decision diagram (BDD) as in one of the examples described above, and which operates alternately in the pre-charge phase and the evaluation phase.

Switching between the two phases, controlling the outputs from the gate circuits, the switching of the select signals input to the selectors, selecting of the output, etc. are controlled by the CPU 501 serving as the control unit in accordance with a preinstalled program so that a correct output is provided from the logic circuit. For example, the CPU 501 reads an encryption program stored in advance in the ROM, and executes the encryption program so as to control the operation the logic circuit using the binary decision diagram (BDD) in the encryption processing unit 503.

A random number generator 504 generates a random number used to generate a key used in the encryption process. The random number generator 504 also generates a random number used in authentication between devices or used in other encryption processes. The random number generator 504 may be implemented by a random number generator using a LFSR (Linear Feedback Shift Register) or a pseudo-random number generator.

A transmission/reception unit 505 is a data communication unit adapted to perform processing associated with data communication with an external device such as a reader/writer or another IC module to output encrypted data generated in the IC mode or receive data from the external device such as the reader/writer.

The present invention has been described above with reference to specific embodiments by way of example and not limitation. It should be apparent to those skilled in the art that various modifications and substitutions are possible without departing from the spirit and the scope of the invention. That is, the embodiments have been described above by way of example and not limitation. The scope of the invention is to be determined solely by the claims.

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The processes disclosed in the present description may be performed time-sequentially in the same order as that described in the program, or may be performed in parallel or individually depending on the processing power of the computer. In the present description, the term "system" is used to describe a logical collection of a plurality of devices, and it is not necessarily required that the plurality of devices be disposed in a single case.

It should be understood by those skilled in the art that various modifications, combinations, sub-combinations and alterations may occur depending on design requirements and other factors insofar as they are within the scope of the appended claims or the equivalents thereof.

What is claimed is:

1. An operation processing apparatus for performing a data conversion on input bits, comprising:

a logic circuit including a plurality of selectors arranged in hierarchical layers having a bottom layer and a top layer, the plurality of selectors being controlled by select signals that are based on the input bits and are inputted into the selectors, wherein selectors in the bottom layer receive constant values and select a set of the constant values based on the select signals, the selected constant values being transferred to selectors in layers higher than the bottom layer, such that an output bit corresponding to the input bits is outputted by a selector in the top layer; and a control unit for controlling the data conversion process such that a pre-charge phase and an evaluation phase are performed alternately in the logic circuit, wherein input values represented by the select signals are set to be equal during the pre-charge phase, and the output bit is generated during the evaluation phase, the evaluation phase being performed when the select signals are switched to change the pre-charge phase.

2. The operation processing apparatus according to claim 1, wherein one of the selectors includes:

a first AND gate for receiving one of the constant values and the select signal;

a second AND gate for receiving one of the constant values and an inverted select signal; and an OR gate for receiving the output of the first AND gate and the output of the second AND gate, wherein the control unit sets the inputs to the first AND gate and the second AND gate to an equal value in the pre-charge phase.

3. The operation processing apparatus according to claim 1, wherein one of the selectors includes a first input node via which to receive the select signal and a second input node via which to receive an inverted select signal, and the logic circuit further includes logic operation elements disposed before the first and second input nodes, wherein the logic operation elements receive a pre-charge signal when the control unit begins the pre-charge phase and the logic operation elements receive the constant values when the one selector is in the bottom layer.

4. The operation processing apparatus according to claim 3, wherein the logic operation elements include AND gates having input terminals such that the input terminals receive the pre-charge signal during the pre-charge phase, and the control unit changes the pre-charge signal being received to switch the phase from the pre-charge phase to the evaluation phase.

5. The operation processing apparatus according to claim 3, wherein the logic operation elements include OR gates having input terminals such that the input terminals receive the pre-charge signal is input, and the control unit switches the pre-charge signal being received to switch the phase from the pre-charge phase to the evaluation phase.

6. The operation processing apparatus according to claim 1, wherein one of the plurality of selectors receiving the equal select signal is a single common selector.

7. The operation processing apparatus according to claim 1, wherein at least one of the selectors includes an inverting output and at least one of selectors includes an inverting input.

8. The operation processing apparatus according to claim 1, wherein the control unit controls the data conversion process such that constant values are input to selectors disposed in the bottom layer during the pre-charge phase, and constant values or random values are input to the selectors in the bottom layer during the evaluation phase.

9. The operation processing apparatus according to claim 1, wherein the control unit controls the outputs of the selectors such that the inputs to the selectors in the bottom layer are randomly set to "0" or "1" in the pre-charge phase.

10. The operation processing apparatus according to claim 1, wherein the logic circuit implements a binary decision diagram (BDD).

11. The operation processing apparatus according to claim 1, wherein the logic circuit performs a nonlinear conversion process as the data conversion process on the input bits.

12. A method for controlling a data conversion process on input bits, the method being performed by an operation processing apparatus and comprising:
generating select signals based on the input bits;
providing the select signals to a plurality of selectors arranged in hierarchical layers in the operation processing apparatus, the hierarchical layers including a bottom layer and a top layer;
providing constant values to selectors in the bottom layer;
selecting a set of the constant values based on the select signals;
transferring the selected constant values to selectors in layers higher than the bottom layer;
outputting an output bit corresponding to the input bit from the top layer; and
switching the select signals to control the data conversion process by alternately implementing a pre-charge phase and an evaluation phase, wherein input values represented by the select signals are set to be equal during the pre-charge phase, and the output bit is generated during the evaluation phase, the evaluation phase being performed when the select signals are switched to change the pre-charge phase.

13. The method according to claim 12, wherein one of the selectors includes:
a first AND gate for receiving one of the constant values and the select signal;
a second AND gate for receiving one of the constant values and an inverted select signal; and
an OR gate for receiving the output of the first AND gate and the output of the second AND gate, wherein the control unit sets the inputs to the first AND gate and the second AND gate to an equal value in the pre-charge phase.

14. The method according to claim 12, wherein one of the selectors includes a first input node via which to receive the select signal and a second input node via which to receive an inverted select signal, and the operation processing apparatus further includes logic operation elements disposed before the first and second input nodes, and wherein the method further comprises providing, to the logic operation elements, a pre-charge signal at the beginning of the pre-charge phase.

15. The method according to claim 14, wherein the logic operation elements include AND gates having input terminals such that the pre-charge signal is provided to the input terminals during the pre-charge phase, and wherein the method further comprises changing the pre-charge signal to switch the phase from the pre-charge phase to the evaluation phase.

16. The method according to claim 14, wherein the logic operation elements include OR gates having input terminals such that the pre-charge signal is provided to the input terminals during the pre-charge phase, and wherein the method further comprises changing to switch the phase from the pre-charge phase to the evaluation phase.

17. The method according to claim 12, wherein the constant values are provided to selectors in the bottom layer, and the constant values or random values are provided to the selectors in the bottom layer.

18. The method according to claim 12, wherein inputs to the selectors in the bottom layer are randomly set to "0" or "1" in the pre-charge phase.

19. A computer-readable storage medium, storing a program which, when executed on an operation processing apparatus, causes the operation processing apparatus to perform a method for controlling a data conversion process on input bits, the method comprising:
generating select signals based on the input bits;
providing the select signals to a plurality of selectors arranged in hierarchical layers in the operation processing apparatus, the hierarchical layers including a bottom layer and a top layer;
providing constant values to selectors in the bottom layer;
selecting a set of the constant values based on the select signals;
transferring the selected constant values to selectors in layers higher than the bottom layer;
outputting an output bit corresponding to the input bit from the top layer; and
switching the select signals to control the data conversion process by alternately implementing a pre-charge phase and an evaluation phase, wherein input values represented by the select signals are set to be equal during the pre-charge phase, and the output bit is generated during the evaluation phase, the evaluation phase being performed when the select signals are switched to change the pre-charge phase.

* * * * *